(12) United States Patent
Piao

(10) Patent No.: US 9,888,246 B2
(45) Date of Patent: Feb. 6, 2018

(54) METHOD AND DEVICE FOR ENCODING SCALABLE VIDEO ON BASIS OF ENCODING UNIT OF TREE STRUCTURE, AND METHOD AND DEVICE FOR DECODING SCALABLE VIDEO

(71) Applicant: SAMSUNG ELECTRONICS CO., LTD., Suwon-si (KR)

(72) Inventor: Yin-ji Piao, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 692 days.

(21) Appl. No.: 14/492,726

(22) Filed: Sep. 22, 2014

(65) Prior Publication Data

US 2015/0016535 A1 Jan. 15, 2015

Related U.S. Application Data

(63) Continuation of application No. PCT/KR2013/002311, filed on Mar. 20, 2013.
(Continued)

(51) Int. Cl.
*H04N 19/176* (2014.01)
*H04N 19/96* (2014.01)
(Continued)

(52) U.S. Cl.
CPC ......... *H04N 19/176* (2014.11); *H04N 19/119* (2014.11); *H04N 19/146* (2014.11); *H04N 19/96* (2014.11); *H04N 19/30* (2014.11)

(58) Field of Classification Search
CPC .................................................. H04N 19/176
See application file for complete search history.

(56) References Cited

U.S. PATENT DOCUMENTS

2010/0098154 A1 4/2010 Lou et al.
2010/0142625 A1 6/2010 Lee et al.
(Continued)

FOREIGN PATENT DOCUMENTS

KR 10-2010-0073772 A 7/2010
KR 10-2011-0017719 A 2/2011
KR 10-2012-0015260 A 2/2012

OTHER PUBLICATIONS

International Preliminary Report on Patentability, Issued by the International Searching Authority, dated Sep. 23, 2014, in counterpart International Application No. PCT/KR2013/002311.
(Continued)

*Primary Examiner* — James Pontius
(74) *Attorney, Agent, or Firm* — Sughrue Mion, PLLC

(57) ABSTRACT

A scalable video encoding method includes splitting a lower-layer image into a maximum coding unit, and encoding the lower-layer image based on coding units having a tree structure obtained by hierarchically splitting the maximum coding unit; splitting a maximum coding unit of an upper-layer image corresponding to the maximum coding unit of the lower-layer image into coding units having the tree structure, based on a split structure of the maximum coding unit of the lower-layer image; determining a structure of a prediction unit included in the coding units of the upper-layer image corresponding to the coding units of the lower-layer image, based on structure information indicating a structure of the prediction unit included in the coding units of the lower-layer image; and determining whether to split the prediction unit included in the coding units of the upper-layer image by comparing a first cost to a second cost.

14 Claims, 19 Drawing Sheets

Related U.S. Application Data

(60) Provisional application No. 61/613,237, filed on Mar. 20, 2012.

(51) Int. Cl.
  *H04N 19/119* (2014.01)
  *H04N 19/146* (2014.01)
  *H04N 19/30* (2014.01)

(56) References Cited

U.S. PATENT DOCUMENTS

| | | |
|---|---|---|
| 2010/0158127 A1 | 6/2010 | Kim et al. |
| 2010/0250764 A1 | 9/2010 | Vare et al. |
| 2013/0212291 A1 | 8/2013 | Lee et al. |
| 2014/0185669 A1* | 7/2014 | Zhang .................. H04N 19/503 375/240.12 |
| 2014/0294065 A1 | 10/2014 | Chen et al. |
| 2015/0003516 A1* | 1/2015 | Kim ..................... H04N 19/103 375/240.02 |
| 2015/0043639 A1* | 2/2015 | Lee ........................ H04N 19/61 375/240.12 |
| 2015/0146780 A1* | 5/2015 | Miyoshi ............... H04N 19/593 375/240.12 |
| 2015/0264351 A1* | 9/2015 | Miyoshi ............... H04N 19/107 375/240.13 |

OTHER PUBLICATIONS

Segall et al., "Spatial Scalability Within the H.264/AVC Scalable Video Coding Extension", IEEE Transactions on Circuits and Systems for Video Technology, pp. 1121-1135, vol. 17, No. 9, Sep. 2007.

Communication, Issued by the International Searching Authority, dated Jun. 26, 2013, in counterpart International Application No. PCT/KR2013/002311.

* cited by examiner

PARTITION TYPE (800)

PREDICTION MODE (810)

SIZE OF TRANSFORMATION UNIT (820)

CODING UNIT (1010)

PREDICTION UNIT (1060)

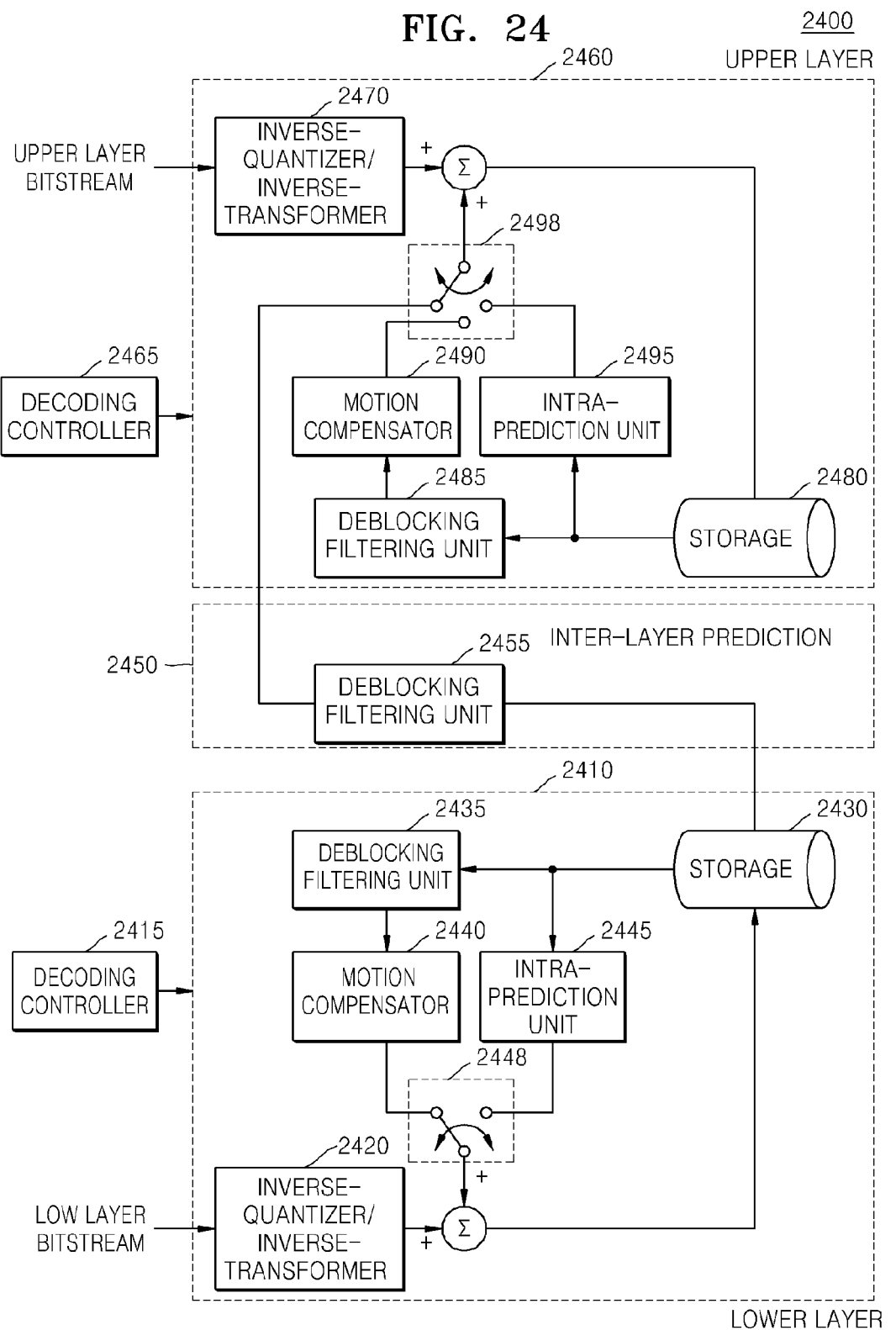

METHOD AND DEVICE FOR ENCODING SCALABLE VIDEO ON BASIS OF ENCODING UNIT OF TREE STRUCTURE, AND METHOD AND DEVICE FOR DECODING SCALABLE VIDEO

CROSS-REFERENCE TO RELATED APPLICATIONS

This application is a continuation application of International Application No. PCT/KR2013/002311, filed on Mar. 20, 2013, which claims priority to U.S. provisional patent application No. 61/613,237 filed on Mar. 20, 2012 in the U.S. Patent and Trademark Office, the entire disclosures of which are herein incorporated by reference in their entirety.

TECHNICAL FIELD

One or more exemplary embodiments relate to a scalable video encoding method and a scalable video decoding method, and a scalable video encoding apparatus and a scalable video decoding apparatus for implementing the same.

BACKGROUND OF THE RELATED ART

Generally, image data is encoded according to a certain data compression standard such as the moving picture expert group (MPEG) standard, and then, stored in an information storage medium or transmitted via a communication channel in the form of a bitstream.

Scalable video coding (SVC) may be used as a video compression method that adjusts an amount of information and transmits the information in correspondence with various communication networks and terminals. With respect to SVC, various layers of encoded video data are included in one bitstream so as to adaptively provide a service via various transmission networks and terminals.

In the case of such conventional scalable video coding, video data is encoded according to a limited encoding method based on a macroblock having a predetermined size.

SUMMARY

The exemplary embodiments provide an inter-layer prediction method of scalably encoding or decoding a multi-layer image based on a coding unit having a tree structure, by using encoding information between each layer.

According to an aspect of an exemplary embodiment, there is provided a scalable video encoding method including: splitting a lower-layer image into a maximum coding unit, and encoding the lower-layer image based on coding units having a tree structure which is obtained by hierarchically splitting the maximum coding unit; splitting a maximum coding unit of an upper-layer image which corresponds to the maximum coding unit of the lower-layer image into coding units having the tree structure, based on a split structure of the maximum coding unit of the lower-layer image; determining a structure of a prediction unit included in the coding units of the upper-layer image which correspond to the coding units of the lower-layer image, based on structure information indicating a structure of the prediction unit included in the coding units of the lower-layer image; and determining whether to split the prediction unit included in the coding units of the upper-layer image by comparing a first cost obtained as a result of prediction-encoding the prediction unit included in the coding units of the upper-layer image based on encoding information included in the coding units of the prediction unit of the lower-layer image, to a second cost obtained as a result of prediction-encoding the prediction unit included in the coding units of the upper-layer image into small prediction units which are smaller than the prediction unit included in the coding units of the upper-layer image based on encoding information of the prediction unit included in the coding units of the lower-layer image.

According to another aspect of an exemplary embodiment, there is provided a scalable video encoder including: a lower-layer encoder configured to split a lower-layer image into a maximum coding unit, and encode the lower-layer image based on coding units having a tree structure which is obtained by hierarchically splitting the maximum coding unit; an upper-layer encoder configured to split a maximum coding unit of an upper-layer image which corresponds to the maximum coding unit of the lower-layer image into coding units having the tree structure, based on a split structure of the maximum coding unit of the lower-layer image, determine a structure of a prediction unit included in the coding units of the upper-layer image which correspond to the coding units of the lower-layer image, based on structure information of a structure of a prediction unit included in the coding units of the lower-layer image, and determine whether to split the prediction unit included in the coding units of the upper-layer image by comparing a first cost obtained as a result of prediction-encoding the prediction unit included in the coding units of the upper-layer image based on encoding information of the prediction unit included in the coding units of the lower-layer image, to a second cost obtained as a result of prediction-encoding the prediction unit included in the coding units of the upper-layer image into small prediction units which are smaller than the prediction unit included in the coding units of the upper-layer image based on encoding information of the prediction unit included in the coding units of the lower-layer image; and an outputter configured to encode a first flag indicating whether a split structure of the maximum coding unit of the upper-layer image is determined based on the split structure of the maximum coding unit of the lower-layer image, and a second flag indicating whether the prediction unit included in the coding units of the upper-layer image is to be split into the small prediction units.

According to another aspect of an exemplary embodiment, there is provided a scalable video decoding method including: parsing encoding information of a lower-layer image and encoding information of an upper-layer image from a bitstream; decoding the lower-layer image based on a coding unit having a tree structure which is obtained by hierarchically splitting a maximum coding unit of the lower-layer image, by using the parsed encoding information of the lower-layer image; obtaining first flag information, which indicates whether a split structure of a maximum coding unit of the upper-layer image is determined based on a split structure of the maximum coding unit of the lower-layer image, from the bitstream; determining the split structure of the maximum coding unit of the upper-layer image and a structure of a prediction unit included in a coding unit of the upper-layer image, based on the first flag information; obtaining second flag information indicating whether the prediction unit included in the coding unit of the upper-layer image is to be split into small prediction units which are smaller than the prediction unit included in the coding unit of the upper-layer image; determining a final prediction unit for prediction-decoding the upper-layer image by determining whether to split the prediction unit included in the coding unit of the upper-layer image based on the second flag information; and prediction-decoding the prediction unit of the upper-layer image, based on encoding information of a prediction unit included in a coding unit of the lower-layer image.

According to another aspect of an exemplary embodiment, there is provided a scalable video decoder including: a parser configured to parse encoding information of a lower-layer image and encoding information of an upper-layer image from a bitstream; a lower-layer decoder configured to decode the lower-layer image based on a coding unit having a tree structure which is obtained by hierarchically splitting a maximum coding unit of the lower-layer image, by using the parsed encoding information of the lower-layer image; and an upper-layer decoder configured to determine a split structure of a maximum coding unit of the upper-layer image and a structure of a prediction unit included in a coding unit of the upper-layer image, based on first flag information obtained from the bitstream, wherein the first flag information indicates whether the split structure of the maximum coding unit of the upper-layer image is determined based on a split structure of the maximum coding unit of the lower-layer image, and determine a final prediction unit for prediction-decoding the upper-layer image by determining whether to split the prediction unit included in the coding unit of the upper-layer image based on second flag information obtained from the bitstream and prediction-decode the prediction unit included in the coding unit of the upper-layer image, based on encoding information of a prediction unit included in a coding unit of the lower-layer image based on the second flag information, wherein the second flag information indicates whether the prediction unit included in the coding unit of the upper-layer image is to be split into small prediction units which are smaller than the prediction unit included in the coding unit of the upper-layer image.

According to exemplary embodiments, encoding information of an upper layer may be obtained based on encoding information of a lower layer. Additionally, according to exemplary embodiments, the encoding information of the upper layer which is obtained based on the encoding information of the lower layer may be selectively changed. In other words, according to exemplary embodiments, initial encoding information of the upper layer may be obtained based on the encoding information of the lower layer, and the initial encoding information may be used for encoding or decoding the upper layer.

BRIEF DESCRIPTION OF THE DRAWINGS

FIG. 24 is a detailed block diagram of a scalable decoding apparatus according to an exemplary embodiment.

DETAILED DESCRIPTION OF EXEMPLARY EMBODIMENTS

Hereinafter, the exemplary embodiments will be described more fully with reference to the accompanying drawings, in which exemplary embodiments are shown.

Figure 1:
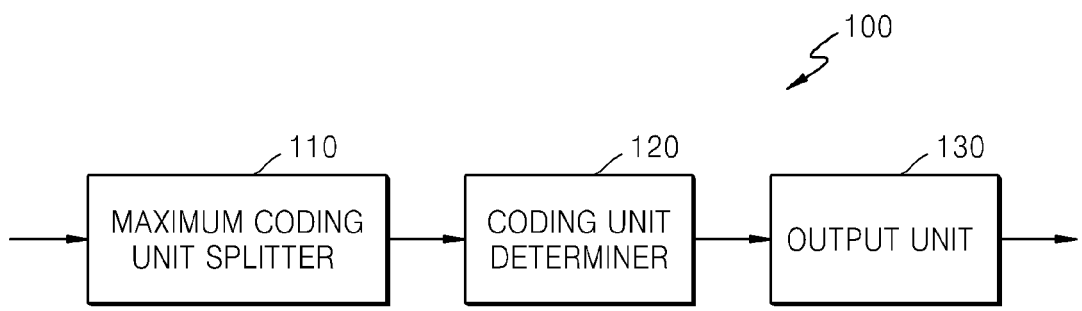
FIG. 1 is a block diagram of an apparatus for video encoding based on coding units having a tree structure according to an exemplary embodiment.

FIG. 1 is a block diagram of a video encoding apparatus 100 according to an exemplary embodiment.

According to an exemplary embodiment, the video encoding apparatus includes a maximum coding unit splitter 110, a coding unit determiner 120, and an output unit 130.

The maximum coding unit splitter 100 may split a current picture based on a maximum coding unit that is a coding unit having a largest size for the current picture. If the current picture is larger than a maximum coding unit, image data of the current picture may be split into at least one maximum coding unit. According to an exemplary embodiment, a maximum coding unit is a data unit having a size of 32×32, 64×64, 128×128, 256×256, or the like, and may be a data unit having a square shape having a width and height which are greater than 8 and which are set according to powers of 2. The image data may be output to the coding unit determiner 120 according to the at least one maximum coding unit.

According to an exemplary embodiment, a coding unit may be characterized by a maximum size and a depth. A depth refers to a number of times for which a coding unit is spatially split from a maximum coding unit. As a depth increases, coding units according to depths may be split into coding units ranging from a maximum coding unit to a minimum coding unit. A depth of a maximum coding unit may be an uppermost depth, and a minimum coding unit may be defined as a lowermost coding unit. Since a size of a coding unit according to depths is decreased as a depth of a maximum coding unit is increased, a coding unit for an upper depth may include a plurality of coding units for lower depths.

As described above, the image data of the current picture is split into maximum coding units according to a maximum size of the coding unit, and each of the maximum coding units may include coding units that are split according to depths. According to an exemplary embodiment, since the maximum coding unit is split according to depths, image data of a spatial domain included in the maximum coding unit may be hierarchically classified according to depths.

A maximum depth and a maximum size of a coding unit, which limit a total number of times for which a height and a width of the maximum coding unit are hierarchically split, may be predetermined.

The coding unit determiner 120 encodes at least one split region obtained by splitting a region of the maximum coding unit according to depths, and determines a depth at which a result of final encoding according to the at least one split region is to be output. In other words, the coding unit determiner 120 encodes the image data in the coding units according to depths, according to a maximum coding unit of the current picture, and selects and determines a depth having a least encoding error as a coded depth. The determined coded depth and image data according to maximum coding units are output to the output unit 130.

The image data in the maximum coding unit is encoded based on coding units according to depths, according to at least one depth that is equal to or less than a maximum depth, and results of encoding the image data based on each of the coding units according to depths are compared to each other. As a result of comparing encoding errors of the coding units according to depths to each other, a depth having a least encoding error may be selected. At least one coded depth may be determined with respect to each maximum coding unit.

Since coding units are hierarchically split as a depth is increased, a number of coding units increases. Also, even if coding units correspond to a same depth and are included in one maximum coding unit, whether each data of the maximum coding unit corresponding to the same depth is split to a lower depth may be determined by measuring an encoding error in image data of each of the coding units. Accordingly, even if data is included in one maximum coding unit, since encoding errors for each depth may vary with locations in the maximum coding unit, coded depths may be determined differently according to locations. Thus, one or more coded depths may be set with respect to one maximum coding unit, and image data of the maximum coding unit may be split according to coding units of one or more coded depths.

Accordingly, according to an exemplary embodiment, the coding unit determiner 120 may determine coding units having a tree structure which are included in the maximum coding unit. According to an exemplary embodiment, 'the coding units having a tree structure' include coding units according to a depth that is determined as a coded depth, from among all coding units according to depths which are included in a current maximum coding unit. A coding unit of a coded depth may be hierarchically determined according to depths in a same region in the maximum coding unit, and may be independently determined in different regions. Likewise, a coded depth in a current region may be determined independently from a coded depth in another region.

According to an exemplary embodiment, a maximum depth is an index related to a number of splitting times from a maximum coding unit to a minimum coding unit. According to an exemplary embodiment, a first maximum depth may denote a total number of splitting times from the maximum coding unit to the minimum coding unit. According to an exemplary embodiment, a second maximum depth may denote a total number of depth levels with respect to the maximum coding unit through the minimum coding unit. For example, if a depth of the maximum coding unit is 0, a depth of a coding unit, in which the maximum coding unit is split once, may be set to 1, and a depth of a coding unit, in which the maximum coding unit is split twice, may be set to 2. In this case, if a coding unit in which the maximum coding unit is split for four times is a minimum coding unit, 5 depth levels that include depths 0 through 4 exist, and thus, a first maximum depth may be set to 4, and a second maximum depth may be set to 5.

Prediction encoding and frequency transformation may be performed according to the maximum coding unit. The prediction encoding and the transformation are also performed based on coding units according to depths, with respect to each maximum coding unit and each depth that is equal to or less than the maximum depth.

Since a number of coding units according to depths increases whenever the maximum coding unit is split for each depth, encoding including the prediction encoding and the frequency transformation needs to be performed with respect to all coding units according to depths which are generated as a depth increases. For convenience of description, the prediction encoding and the transformation are described based on a coding unit of a current depth, from among at least one maximum coding unit.

According to an exemplary embodiment, the video encoding apparatus 100 may variously select a size or shape of a data unit for encoding image data. Operations such as prediction encoding, transformation, and entropy encoding are performed so as to encode the image data, and a same data unit may be used for all operations or a data unit may be changed according to an operation.

For example, the video encoding apparatus 100 may select not only a coding unit for encoding image data, but also a data unit different from the coding unit so as to perform prediction encoding on the image data of the coding unit.

According to an exemplary embodiment, the prediction encoding may be performed based on a coding unit corresponding to a coded depth, e.g., based on a coding unit that is no longer split to coding units, so as to perform prediction encoding in the maximum coding unit. Hereinafter, a coding unit that is no longer split and becomes a basis unit for prediction encoding may be referred to as a 'prediction unit'. A partition obtained by splitting the prediction unit may include a data unit obtained by splitting at least one selected from the group consisting of a height and a width of the prediction unit.

For example, when a coding unit having a size of 2N×2N (where N is a positive integer) is no longer split, the coding unit becomes a prediction unit of 2N×2N, and a size of a partition may be 2N×2N, 2N×N, N×2N, or N×N. According to an exemplary embodiment, examples of a partition type may not only include symmetrical partitions that are obtained by symmetrically splitting a height or width of the prediction unit, but also selectively include partitions obtained by asymmetrically splitting a height or width of the prediction unit such as with a ratio of 1:n or n:1, partitions that are obtained by geometrically splitting the prediction unit, or partitions having arbitrary shapes.

A prediction mode of the prediction unit may be at least one selected from the group consisting of an intra-mode, an inter-mode, and a skip mode. For example, the intra-mode or the inter-mode may be performed on the partition having a size of 2N×2N, 2N×N, N×2N, or N×N. Also, the skip mode may be performed only on the partition having a size of 2N×2N. The encoding is independently performed on one prediction unit in a coding unit, thereby selecting a prediction mode having a least encoding error.

According to an exemplary embodiment, the video encoding apparatus 100 may perform frequency transformation on image data in a coding unit, based on not only the coding unit for encoding image data, but also a data unit that is different from the coding unit.

Frequency transformation may be performed based on a data unit having a size smaller than or equal to the coding unit so as to perform the transformation in the coding unit. For example, the data unit for frequency transformation may include a data unit for an intra-mode and a data unit for an inter-mode.

Hereinafter, a data unit used as a basis of frequency transformation may be referred to as a 'transformation unit'. Similarly to a coding unit, a transformation unit in a coding unit may be recursively split into a transformation unit of a small size, and thus, residual data of the coding unit may be split into transformation units having a tree structure according to a transformation depth.

According to an exemplary embodiment, a transformation depth indicating a number of times, for which a height and width of the coding unit are split until a transformation unit is obtained, may also be set. For example, with respect to a current coding unit having a size of 2N×2N, a transformation depth may be set to 0 if a size of a transformation unit is 2N×2N, set to 1 if a size of a transformation unit is N×N, and set to 2 if a size of a transformation unit is N/2×N/2. In other words, a transformation unit having a tree structure according to a transformation depth may be set.

Encoding information for each coded depth requires information related to prediction encoding and frequency transformation as well as information about a coded depth. Accordingly, the coding unit determiner 120 determines not only a coded depth having a least encoding error, but also a partition type obtained by splitting a prediction unit into a partition, a prediction mode according to a prediction unit, and a size of a transformation unit for frequency transformation.

According to an exemplary embodiment, coding units according to a tree structure in a maximum coding unit and a method of determining a partition are described in detail with reference to FIGS. 3 through 12.

The coding unit determiner 120 may measure an encoding error of deeper coding units according to depths by using a rate-distortion optimization based on Lagrangian multipliers.

The output unit 130 outputs, in bitstreams, image data of a maximum coding unit, which is encoded based on at least one coded depth determined by the coding unit determiner 120, and information about an encoding mode according to each coded depth.

The encoded image data may be a result obtained by encoding residual data of an image.

The information about the encoding mode according to each coded depth may include information about the coded depth, information about a partition type in a prediction unit, prediction mode information, and information about a size of a transformation unit.

Information about a coded depth may be defined by using split information according to each depth which indicates whether encoding is performed on coding units of a lower depth instead of a current depth. If a current depth of a current coding unit is a coded depth, the current coding unit is encoded into a coding unit of the current depth, and thus split information of the current depth may be defined not to split the current coding unit for a lower depth. Alternatively, if a current depth of the current coding unit is not a coded depth, encoding is performed on a coding unit of a lower depth, and thus split information may be defined to split the current coding unit to obtain coding units of the lower depth.

If a current depth is not a coded depth, encoding is performed on a coding unit that is split into a coding unit of a lower depth. Since at least one coding unit of the lower depth exists in a coding unit of the current depth, the encoding is repeatedly performed on each coding unit of the lower depth, so that the encoding is recursively performed for coding units having the same depth.

Since the coding units having a tree structure are determined with respect to one maximum coding unit and information about at least one encoding mode needs to be determined with respect to a coding unit of a coded depth, information about at least one encoding mode may be determined with respect to one maximum coding unit. Also, since image data of the maximum coding unit is hierarchically split according to depths and a coded depth of the image data may vary with locations, information about a coded depth and an encoding mode may be set with respect to the image data.

Accordingly, according to an exemplary embodiment, the output unit 130 may allocate encoding information about a coded depth and an encoding mode to at least one selected from the group consisting of a coding unit, a prediction unit, and a minimum unit which are included in the maximum coding unit.

According to an exemplary embodiment, a minimum unit is a rectangular data unit obtained by splitting the minimum coding unit constituting a lowermost depth by 4. Alternatively, a minimum unit may be a maximum-sized rectangular data unit that may be included in all coding units, prediction units, partition units, and transformation units included in the maximum coding unit.

For example, encoding information output by the output unit 130 may be classified into encoding information according to each coding unit and encoding information according to each prediction unit. The encoding information according to each coding unit may include prediction mode information and partition size information. Encoding information transmitted with respect to each prediction unit may include information about a predicted direction of an inter-mode, information about a reference image index of an inter-mode, information about a motion vector, information about a chroma component of an intra-mode, and information about an interpolation method of an intra-mode. Additionally, information about a maximum size of a coding unit defined according to pictures, slices, or groups of pictures (GOPs) and information about a maximum depth may be inserted into a header of a bitstream.

According to an exemplary embodiment of the video encoding apparatus 100 having a simplest form, a deeper coding unit according to depths may be a coding unit having a size that is obtained by dividing a height or width of a coding unit of a hierarchically upper depth into two parts. In other words, when a size of a coding unit of a current depth is 2N×2N, a size of a coding unit of a lower depth is N×N. Additionally, a current coding unit having a size of 2N×2N may include 4 coding units of a lower depth having a size of N×N at maximum.

Accordingly, according to an exemplary embodiment, the video encoding apparatus 100 may configure coding units having a tree structure by determining coding units having an optimum shape and an optimum size for each maximum coding unit, based on a size of a maximum coding unit and a maximum depth determined in consideration of characteristics of a current picture. Additionally, since encoding may be performed on each maximum coding unit by using any one of various prediction modes and frequency transformations methods, an optimum encoding mode may be determined in consideration of image characteristics of coding units of various image sizes.

Thus, if an image having a high resolution or a large data amount is encoded in a conventional macroblock, a number of macroblocks per picture excessively increases. Accordingly, an amount of compressed information generated for each macroblock is increased, and thus it may be difficult to transmit the compressed information and data compression efficiency may be reduced. However, according to an exemplary embodiment, the video encoding apparatus 100 may adjust a coding unit in consideration of image characteristic while increasing a maximum size of the coding unit in consideration of a size of an image, thus improving image compression efficiency.

Figure 2:
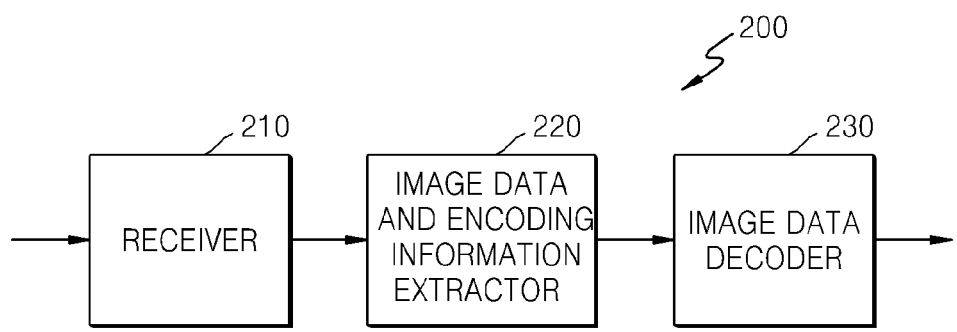
FIG. 2 is a block diagram of an apparatus for video decoding based on coding units having a tree structure according to an exemplary embodiment.

FIG. 2 is a block diagram of a video decoding apparatus 200 according to an exemplary embodiment.

According to an exemplary embodiment, the video decoding apparatus 200 includes a receiver 210, an image data and encoding information extractor 220, and an image data decoder 230. According to an exemplary embodiment, definitions of various terms for various operations of the apparatus 200, such as a coding unit, a depth, a prediction unit, a transformation unit, and information about various encoding modes, may be identical to those terms described with reference to FIG. 1 and the video encoding apparatus 100.

The receiver 210 receives and parses a bitstream of an encoded video. The image data and encoding information extractor 220 extracts encoded image data for each coding unit from the parsed bitstream wherein each coding unit has a tree structure according to each maximum coding unit, and outputs the extracted image data to the image data decoder 230. The image data and encoding information extractor 220 may extract information about a maximum size of a coding unit of a current picture, from a header of the current picture.

Additionally, the image data and encoding information extractor 220 extracts information about a coded depth and an encoding mode with respect to coding units having a tree structure according to each maximum coding unit, from the parsed bitstream. The extracted information about the coded depth and the encoding mode is output to the image data decoder 230. In other words, the image data in a bitstream is split into a maximum coding unit so that the image data decoder 230 decodes the image data for each maximum coding unit.

The information about the coded depth and the encoding mode according to the maximum coding unit may be set with respect to information about one or more pieces of coding depth information, and information about an encoding mode for each coded depth may include information about a partition type of a coding unit corresponding to the coded depth, information about a prediction mode, and information about a size of a transformation unit. Additionally, splitting information according to depths may be extracted as the information about the coded depth.

The information about the coded depth and the encoding mode according to each maximum coding unit, which is extracted by the image data and encoding information extractor 220, is information about a coded depth and an encoding mode which are determined to generate a minimum encoding error when an encoder such as the video encoding apparatus 100 repeatedly performs encoding for each deeper coding unit according to an encoding method that generates a minimum encoding error. Accordingly, the video decoding apparatus 200 may restore an image by decoding image data according to a coded depth and an encoding mode that generates the minimum encoding error.

According to an exemplary embodiment, since information about a coded depth and an encoding mode may be allocated to a certain data unit selected from the group consisting of a coding unit, a prediction unit, and a minimum unit which corresponds to the data unit, the image data and encoding information extractor 220 may extract the information about the coded depth and the encoding mode from each data unit. If the information about the coded depth and the encoding mode according to each data unit is written to each data unit, each data unit having the information about the coded depth and the encoding mode may be inferred to be data units included in the same maximum coding unit.

The image data decoder 230 restores a current picture by decoding image data in each maximum coding unit based on the information about the coded depth and the encoding mode according to the maximum coding units. In other words, the image data decoder 230 may decode image data, encoded based on a read partition type, prediction mode, and transformation unit, with respect to each coding unit from among coding units having a tree structure included in the maximum coding unit. A decoding process may include a prediction process that includes intra-prediction and motion compensation, and a frequency inverse transformation.

The image data decoder 230 may perform intra-prediction or motion compensation according to a partition mode and a prediction mode of each coding unit, based on partition type information and prediction mode information of a prediction unit of a coding unit according to coded depths.

Additionally, the image data decoder 230 may perform frequency inverse transformation according to each transformation unit in the coding unit, based on the information about a size of a transformation unit of the coding unit according to coded depths, so as to perform frequency inverse transformation according to maximum coding units.

The image data decoder 230 may determine a coded depth of a current maximum coding unit by using split information according to depths. If the split information indicates that image data is no longer split in a current depth, the current depth is a coded depth. Accordingly, the image data decoder 230 may decode a coding unit of a current depth with respect to image data of the current maximum coding unit by using the information about a partition type of a prediction unit, a prediction mode, and a size of a transformation unit.

In other words, after encoding information that is set for a predetermined data unit from among the coding unit, the prediction unit, and the minimum unit is observed, data units containing encoding information that includes the same split information may be gathered, and thus, the gathered data units may be considered as one data unit that is to be decoded in a same encoding mode by the image data decoder 230.

According to an exemplary embodiment, the video decoding apparatus 200 may obtain information about a coding unit that generates a minimum encoding error when encoding is recursively performed for each maximum coding unit in an encoding process, and may use the information to decode a current picture. In other words, image data of coding units having a tree structure may be decoded, wherein the coding units are determined as optimum coding units in each maximum coding unit.

Accordingly, even if an image has a high resolution or a large amount of data, data of the image may be efficiently decoded and restored according to using a size of a coding unit and an encoding mode which are adaptively determined with respect to characteristics of the image, by using information about an optimum encoding mode transmitted from an encoder.

Hereinafter, according to an exemplary embodiment, a method of determining coding units having a tree structure, a prediction unit, and a transformation unit is described with reference to FIGS. 3 through 13.

Figure 3:
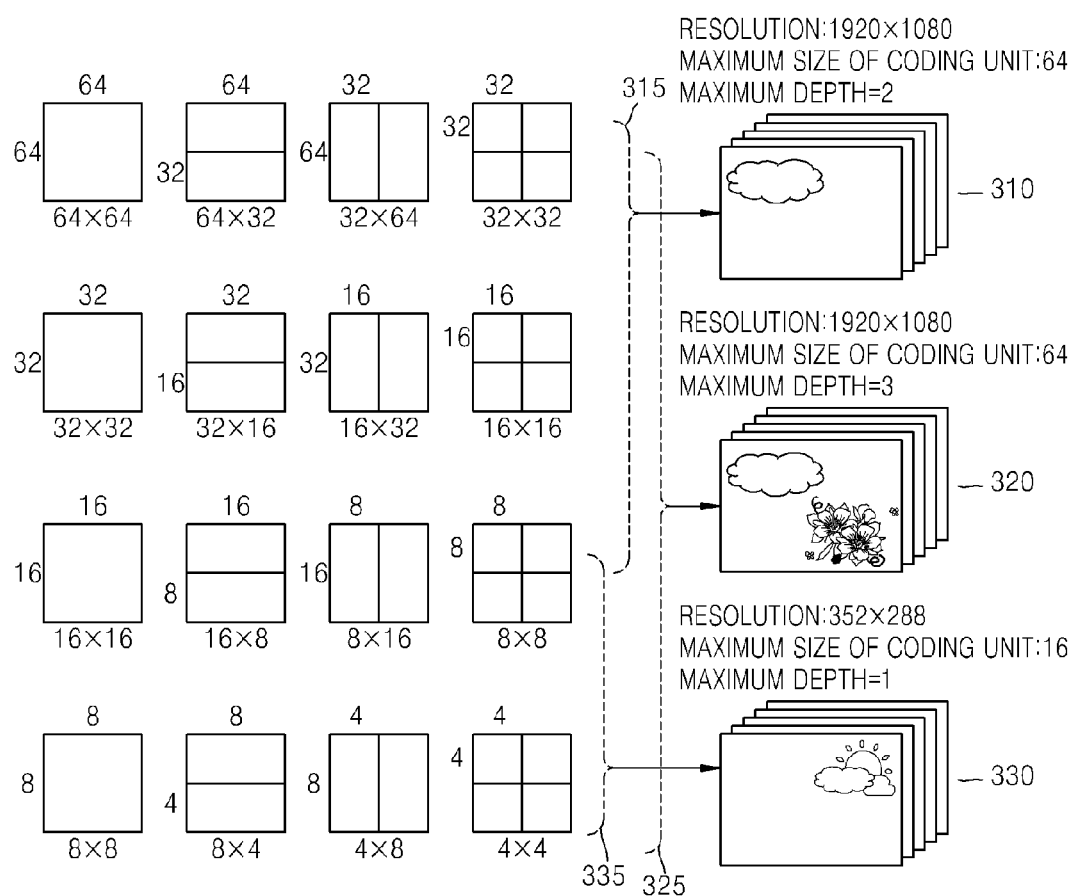
FIG. 3 illustrates a concept of coding units according to an exemplary embodiment.

FIG. 3 illustrates a concept of a hierarchical coding unit according to an exemplary embodiment.

A size of a coding unit may be expressed in width×height, and may be 64×64, 32×32, 16×16, and 8×8. A coding unit of 64×64 may be split into partitions of 64×64, 64×32, 32×64, or 32×32, a coding unit of 32×32 may be split into partitions of 32×32, 32×16, 16×32, or 16×16, a coding unit of 16×16 may be split into partitions of 16×16, 16×8, 8×16, or 8×8, and a coding unit of 8×8 may be split into partitions of 8×8, 8×4, 4×8, or 4×4.

With respect to video data 310, a resolution is set to 1920×1080, a maximum size of a coding unit is set to 64, and a maximum depth is set to 2. With respect to video data 320, a resolution is set to 1920×1080, a maximum size of a coding unit is 64, and a maximum depth is set to 3. In video data 330, a resolution is set to 352×288, a maximum size of a coding unit is set to 16, and a maximum depth is set to 1. The maximum depth shown in FIG. 3 denotes a total number of splits of a maximum coding unit to a minimum decoding unit.

If a resolution is high or a data amount is large, a maximum size of a coding unit may be large so as to not only increase encoding efficiency but also to accurately reflect characteristics of an image. Accordingly, since the video data 310 and 320 have a higher resolution than the video data 330, the maximum size of the coding unit of the video data 310 and 320 may be selected as 64.

Since the maximum depth of the video data 310 is 2, coding units 315 of the video data 310 may include a maximum coding unit having a long axis size of 64, and coding units having long axis sizes of 32 and 16 as depths are increased by two layers by splitting the maximum coding unit twice. Meanwhile, since the maximum depth of the video data 330 is 1, coding units 335 of the video data 330 may include a maximum coding unit having a long axis size of 16, through coding units having a long axis size of 8 as depths are deepened to one layer by splitting the maximum coding unit once.

Since the maximum depth of the video data 320 is 3, coding units 325 of the video data 320 may include a maximum coding unit having a long axis size of 64, and coding units having long axis sizes of 32, 16, and 8 as the depths are increased by 3 layers by splitting the maximum coding unit three times. As a depth increases, detailed information may be precisely expressed.

Figure 4:
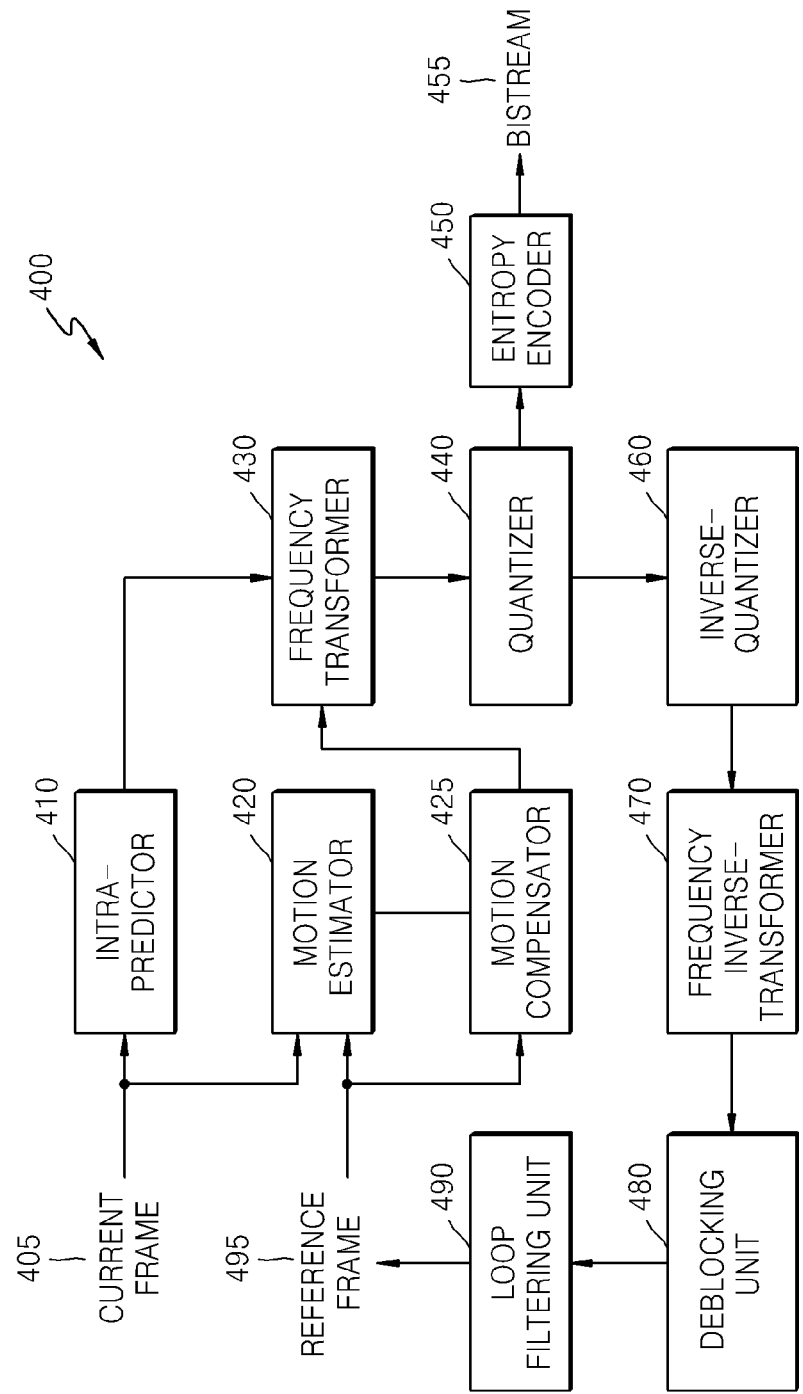
FIG. 4 is a block diagram of an image encoder that is based on coding units according to an exemplary embodiment.

FIG. 4 is a block diagram of an image encoder 400 based on coding units, according to an exemplary embodiment.

According to an exemplary embodiment, the image encoder 400 performs operations of the coding unit determiner 120 of the video encoding apparatus 100 to encode image data. In other words, an intra-predictor 410 performs intra-prediction on coding units in an intra-mode in a current frame 405, and a motion estimator 420 and a motion compensator 425 perform inter-estimation and motion compensation by using the current frame 405, and a reference frame 495 in the inter-mode.

Data output from the intra-predictor 410, the motion estimator 420, and the motion compensator 425 is output as a quantized transformation coefficient via a frequency transformer 430 and a quantizer 440. The quantized transformation coefficient is restored as data in a spatial domain via an inverse-quantizer 460 and a frequency inverse-transformer 470, and the restored data in the spatial domain is output as the reference frame 495 after being post-processed via a deblocking unit 480 and a loop filtering unit 490. The quantized transformation coefficient may be output as a bitstream 455 via an entropy encoder 450.

According to an exemplary embodiment, all elements of the image encoder 400, such as the intra-predictor 410, the motion estimator 420, the motion compensator 425, the frequency transformer 430, the quantizer 440, the entropy encoder 450, the inverse-quantizer 460, the frequency inverse-transformer 470, the deblocking unit 480, and the loop filtering unit 490, perform operations based on each coding unit from among coding units having a tree structure in consideration of the maximum depth of each maximum coding unit, so that the image encoder 400 is applied to the video encoding apparatus 100.

Particularly, the intra-predictor 410, the motion estimator 420, and the motion compensator 425 determine partitions and a prediction mode of each coding unit from among the coding units having a tree structure in consideration of a maximum size and a maximum depth of a current maximum coding unit, and the frequency transformer 430 determines a size of the transformation unit in each coding unit from among the coding units having a tree structure.

Figure 5:
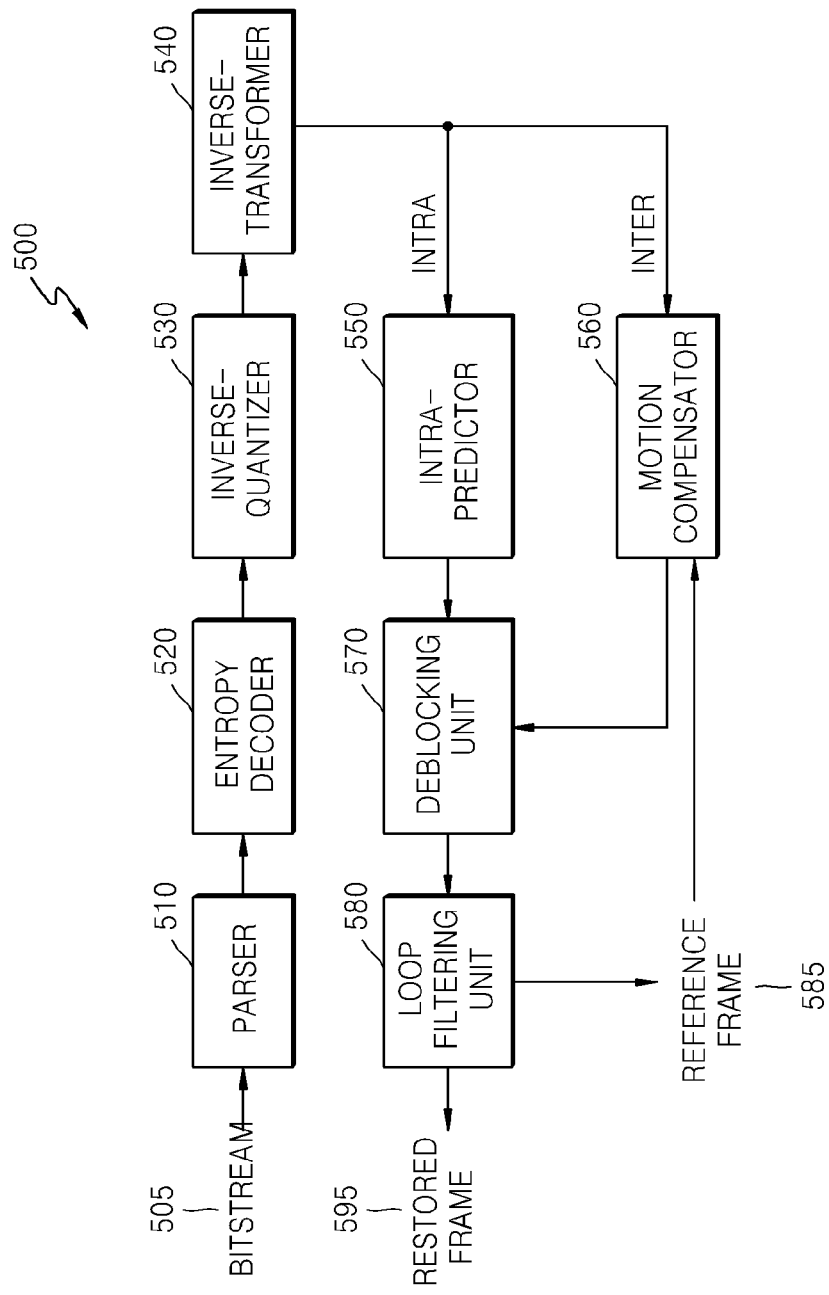
FIG. 5 is a block diagram of an image decoder that is based on coding units according to an exemplary embodiment.

FIG. 5 is a block diagram of an image decoder 500 based on coding units, according to an exemplary embodiment.

A parser 510 parses encoded image data to be decoded and information about encoding required for decoding from a bitstream 505. The encoded image data is output as inverse quantized data through an entropy decoder 520 and an inverse-quantizer 530, and the inverse quantized data is restored to image data in a spatial domain through an inverse transformer 540.

An intra-predictor 550 performs intra-prediction on coding units in an intra-mode with respect to the image data in the spatial domain, and a motion compensator 560 performs motion compensation on coding units in an inter-mode by using a reference frame 585.

The image data in the spatial domain, which passed through the intra-predictor 550 and the motion compensator 560, may be output as a restored frame 595 after being post-processed through a deblocking unit 570 and a loop filtering unit 580. Also, the image data that is post-processed through the deblocking unit 570 and the loop filtering unit 580 may be output as the reference frame 585.

According to an exemplary embodiment, the image decoder 500 may perform operations that are performed after the parser 510 so as to decode the image data in the image data decoder 230 included in the video decoding apparatus 200.

According to an exemplary embodiment, all elements of the image decoder 500, such as the parser 510, the entropy decoder 520, the inverse-quantizer 530, the inverse transformer 540, the intra-predictor 550, the motion compensator 560, the deblocking unit 570, and the loop filtering unit 580 perform operations based on coding units having a tree structure for each maximum coding unit, so that the image decoder 500 is applied to the video decoding apparatus 200.

Specifically, the intra-predictor 550 and the motion compensator 560 determine partitions and a prediction mode for each of the coding units having a tree structure, and the frequency inverse transformer 540 determines a size of the transformation unit in each coding unit.

Figure 6:
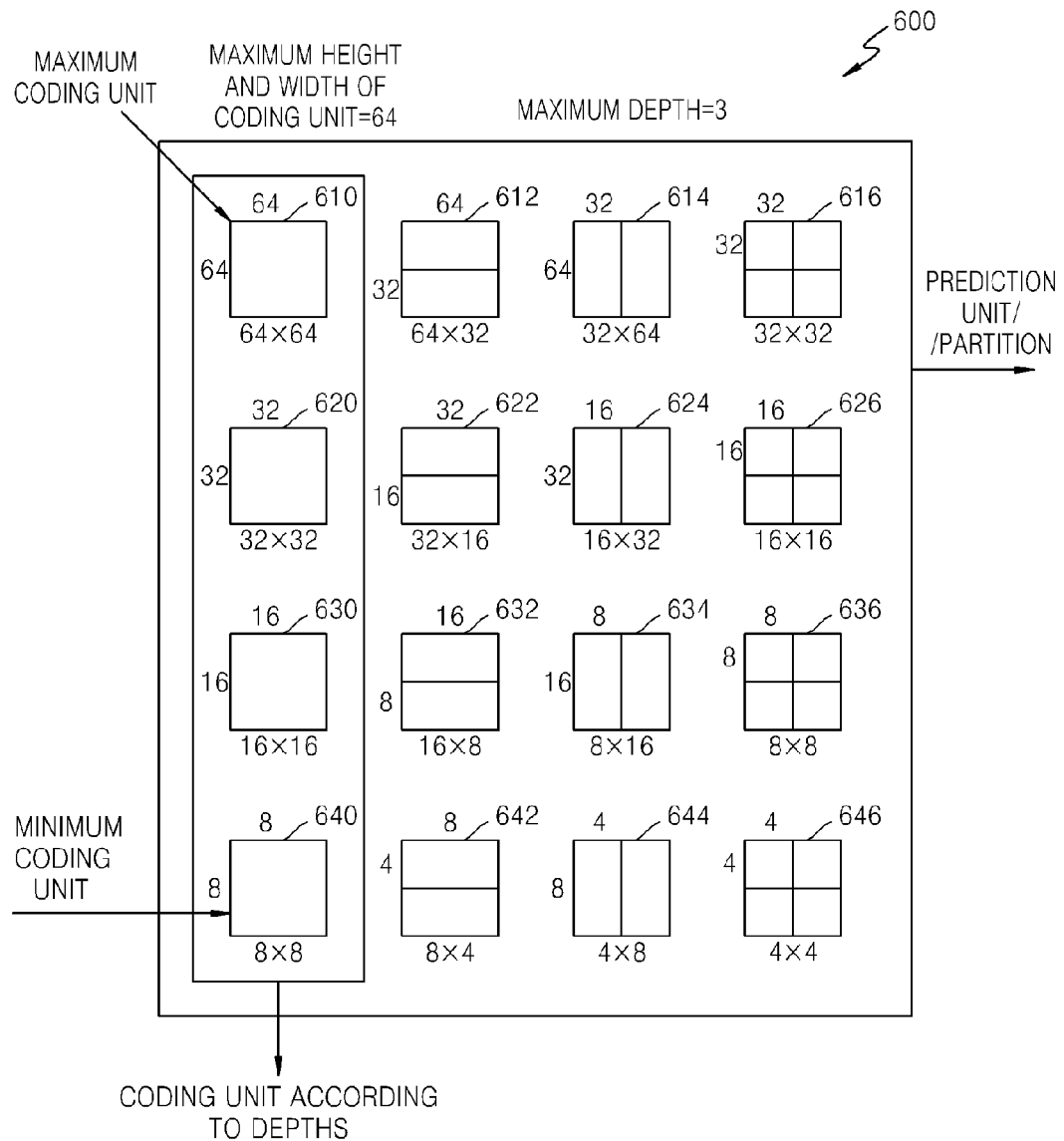
FIG. 6 illustrates coding units according to depths and partitions according to an exemplary embodiment.

FIG. 6 illustrates coding units according to depths, and partitions according to an exemplary embodiment.

According to an exemplary embodiment, the video encoding apparatus 100 and the video decoding apparatus 200 use hierarchical coding units so as to take characteristics of an image into consideration. A maximum height, a maximum width, and a maximum depth of coding units may be adaptively determined according to the characteristics of the image, or may be variously set by a user. Sizes of coding units according to depths may be determined according to a predetermined maximum size of the coding unit.

According to an exemplary embodiment, with respect to a hierarchical structure 600 of coding units, a maximum height and a maximum width of the coding units are each 64, and a maximum depth is 4. Since a depth deepens along a vertical axis of the hierarchical structure 600, a height and a width of a coding unit according to depths are each split. Also, a prediction unit and partitions, which are bases for prediction encoding of each coding unit according to depths, are shown along a horizontal axis of the hierarchical structure 600.

In other words, a coding unit 610 is a maximum coding unit in the hierarchical structure 600, wherein a depth is 0 and a size, and a size of the coding unit, that is, a height by width is 64×64. The depth deepens along a vertical axis, and a coding unit 620 having a size of 32×32 and a depth of 1, a coding unit 630 having a size of 16×16 and a depth of 2, and a coding unit 640 having a size of 8×8 and a depth of 3 are provided. According to an exemplary embodiment, the coding unit 640 having a size of 8×8 and a depth of 3 is a minimum coding unit.

The prediction unit and the partitions of a coding unit are arranged along a horizontal axis according to each depth. In other words, if the coding unit 610 having a size of 64×64 and a depth of 0 is a prediction unit, the prediction unit may be split into partitions included in the encoding unit 610 having a size of 64×64, such as a partition 610 having a size of 64×64, partitions 612 having a size of 64×32, partitions 614 having a size of 32×64, or partitions 616 having a size of 32×32.

Likewise, a prediction unit of the coding unit 620 having a size of 32×32 and a depth of 1 may be split into partitions included in the coding unit 620 having a size of 32×32, such as a partition 620 having a size of 32×32, partitions 622 having a size of 32×16, partitions 624 having a size of 16×32, and partitions 626 having a size of 16×16.

Likewise, a prediction unit of the coding unit 630 having a size of 16×16 and a depth of 2 may be split into partitions included in the coding unit 630 having a size of 16×16, such as a partition 630 having a size of 16×16, partitions 632 having a size of 16×8, partitions 634 having a size of 8×16, and partitions 636 having a size of 8×8.

A prediction unit of the coding unit 640 having a size of 8×8 and a depth of 3 may be split into partitions included in the coding unit 640 having a size of 8×8, such as a partition 640 having a size of 8×8, partitions 642 having a size of 8×4, partitions 644 having a size of 4×8, and partitions 646 having a size of 4×4.

According to an exemplary embodiment, the coding unit determiner 120 included in the video encoding apparatus 100 performs encoding on coding units corresponding to each depth which is included in the maximum coding unit 610, so as to determine a coded depth of each coding unit included in the maximum coding unit 610.

A number of coding units according to depths, which includes data in a same range and having a same size, increases as the depth deepens. For example, four coding units corresponding to a depth of 2 are required with respect to data included in one coding unit corresponding to a depth of 1. Accordingly, the coding unit corresponding to the depth of 1 and four coding units corresponding to the depth of 2 are each encoded, so as to compare encoding results of the same data according to depths.

In order to perform encoding according to depths, a representative encoding error that is a least encoding error in a depth, may be selected by performing encoding for each prediction unit in the coding units according to the current depth along a horizontal axis of the hierarchical structure 600. Alternatively, as the depth deepens along a vertical axis of the hierarchical structure 600, a minimum encoding error may be searched for by performing encoding for each depth and comparing a least encoding errors according to depths. A depth and a partition having a minimum encoding error in the coding unit 610 may be selected as a coded depth and a partition type of the coding unit 610.

Figure 7:
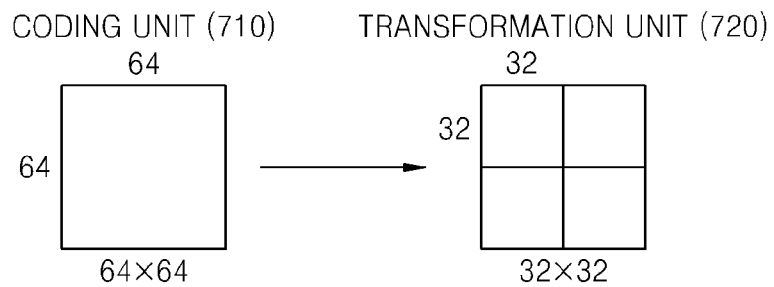
FIG. 7 illustrates a relation between a coding unit and transformation units according to an exemplary embodiment.

FIG. 7 illustrates a relation between a coding unit 710 and transformation units 720, according to an exemplary embodiment.

The video encoding apparatus 100 or the video decoding apparatus 200 encodes or decodes an image in a coding unit having a size equal to or less than a maximum coding unit for each maximum coding unit. Sizes of transformation units for frequency transformation in an encoding process may be selected based on data units that are not larger than each coding unit.

For example, according to an exemplary embodiment, with respect to the video encoding apparatus 100 or the video decoding apparatus 200, if a size of the coding unit 710 is 64×64, frequency transformation may be performed by using the transformation units 720 having a size of 32×32.

Also, data of the coding unit 710 having a size of 64×64 may be encoded by performing the frequency transformation on each of the transformation units having a size of 32×32, 16×16, 8×8, or 4×4 which are equal to or smaller than 64×64, and then a transformation unit having a least coding error may be selected.

Figure 8:
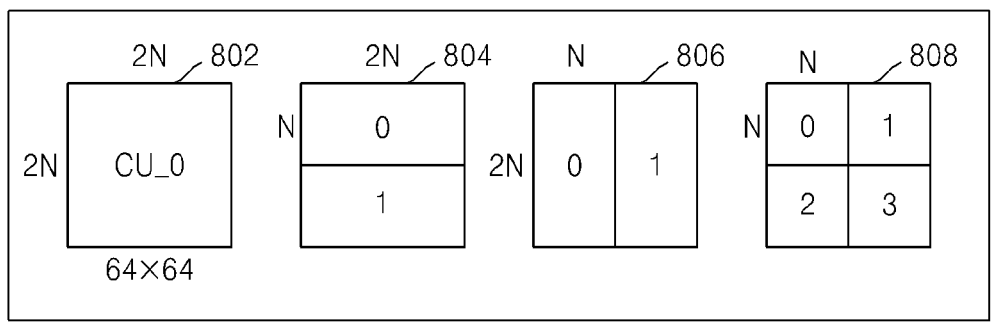
FIG. 8 illustrates encoding information according to depths according to an exemplary embodiment.
Figure 8:
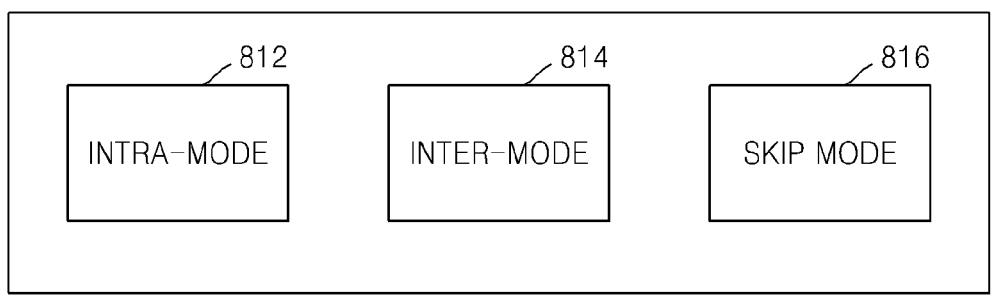
Figure 8:
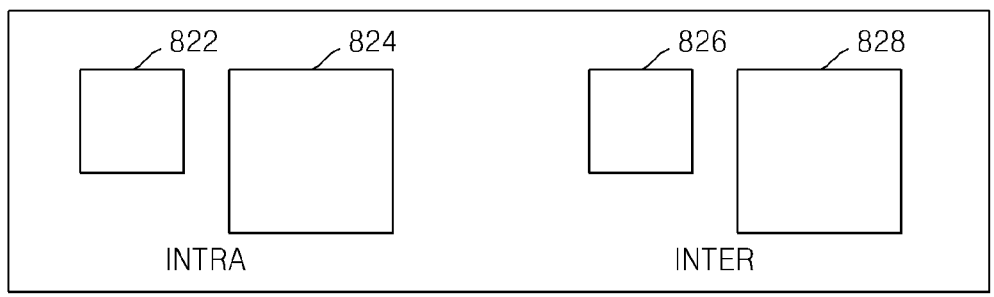

FIG. 8 illustrates encoding information of coding units according to depths, according to an exemplary embodiment.

According to an exemplary embodiment, the output unit 130 included in the video encoding apparatus 100 may encode and transmit partition type information 800, prediction mode information 810, and transformation unit size information 820 for each coding unit corresponding to a coded depth, as information about an encoding mode.

The partition type information 800 indicates information about a shape of a partition obtained by splitting a prediction unit of a current coding unit, wherein the partition is a data unit for prediction-encoding the current coding unit. For example, a current coding unit CU_0 having a size of 2N×2N may be split into any one of a partition 802 having a size of 2N×2N, a partition 804 having a size of 2N×N, a partition 806 having a size of N×2N, and a partition 808 having a size of N×N. In this case, the partition type information 800 is set to indicate one of the partition 802 having a size of 2N×2N, the partition 804 having a size of 2N×N, the partition 806 having a size of N×2N, and the partition 808 having a size of N×N.

The prediction mode information 810 indicates a prediction mode of each partition. For example, the information 810 may indicate a mode of prediction encoding performed on a partition indicated by the information 800, e.g., an intra-mode 812, an inter-mode 814, or a skip mode 816.

The transformation unit size information 820 indicates a transformation unit that is a basis on which frequency transformation is performed on a current coding unit. For example, a transformation unit may be a first intra-transformation unit 822, a second intra-transformation unit 824, a first inter-transformation unit 826, or a second intra-transformation unit 828.

According to an exemplary embodiment, the image data and encoding information extractor 220 included in the video decoding apparatus 200 may extract and use the partition type information 800, the prediction mode 810, and the transformation unit size information 820 for decoding, with respect to each coding unit according to depths.

Figure 9:
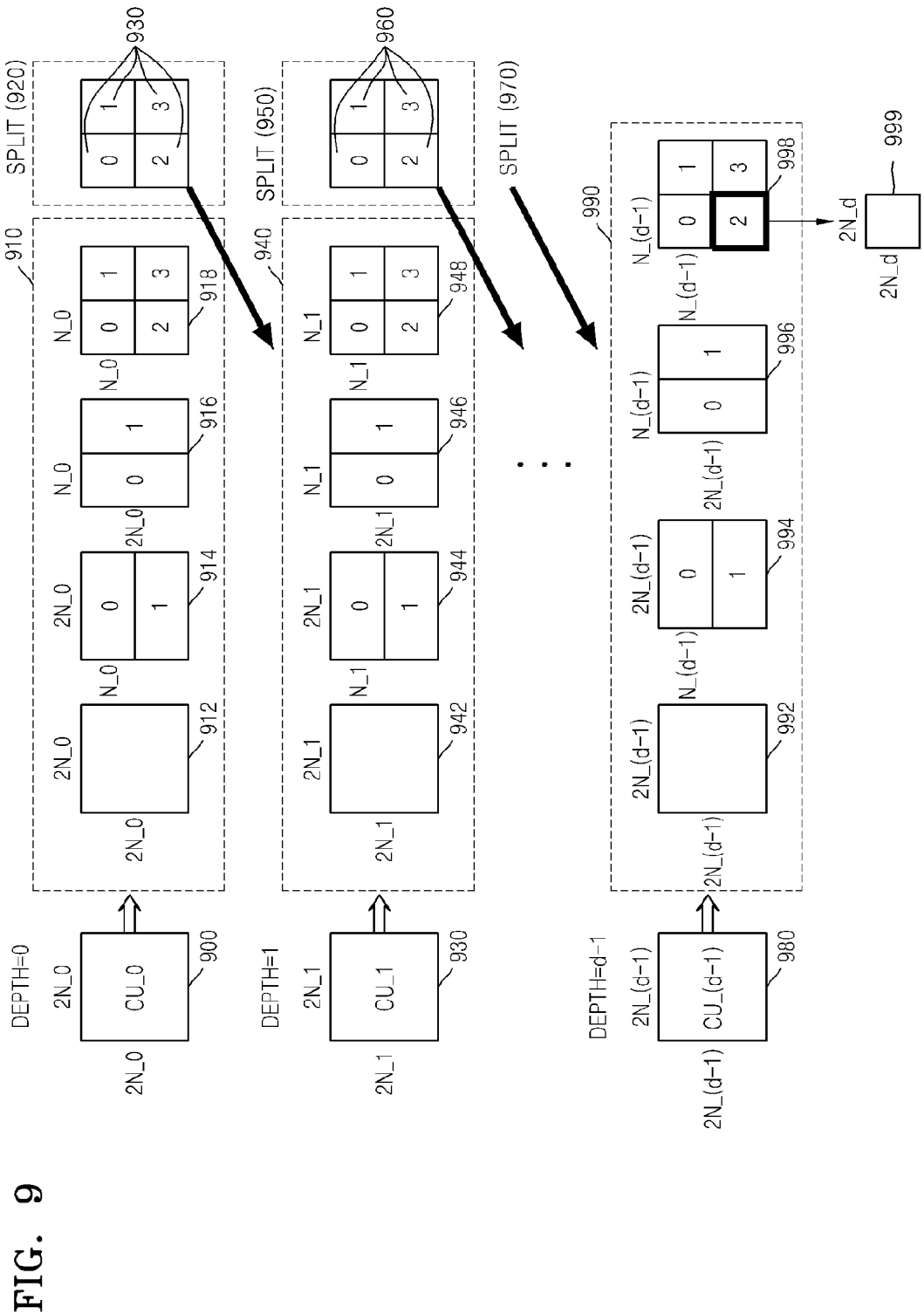
FIG. 9 illustrates coding units according to depths according to an exemplary embodiment.

FIG. 9 illustrates coding units according to depths according to an exemplary embodiment.

Split information may be used to indicate a change of a depth. Spilt information indicates whether a coding unit of a current depth is split into coding units of a lower depth.

A prediction unit 910 for prediction-encoding a coding unit 900 having a depth of 0 and a size of 2N_0×2N_0 may include partitions of a partition type 912 having a size of 2N_0×2N_0, a partition type 914 having a size of 2N_0×N_0, a partition type 916 having a size of N_0×2N_0, and a partition type 918 having a size of N_0×N_0. FIG. 9 only illustrates the partition types 912 through 918 which are obtained by symmetrically splitting the prediction unit 910, but a partition type is not limited thereto. The partitions of the prediction unit 910 may include asymmetrical partitions, partitions having an arbitrary shape, and partitions having a geometrical shape.

Prediction encoding should be repeatedly performed on one partition having a size of 2N_0×2N_0, two partitions having a size of 2N_0×N_0, two partitions having a size of N_0×2N_0, and four partitions having a size of N_0×N_0, according to each partition type. The prediction encoding in an intra-mode and an inter-mode may be performed on the partitions having sizes of 2N_0×2N_0, N_0×2N_0, 2N_0×N_0, and N_0×N_0. The prediction encoding in a skip mode is performed only on the partition having a size of 2N_0×2N_0.

If an encoding error is smallest in one of the partition types 912 through 916 which respectively have a size of 2N_0×2N_0, 2N_0×N_0 and N_0×2N_0, the prediction unit 910 may not be split into a lower depth.

If an encoding error is smallest in the partition type 918 having a size of N_0×N_0, a depth is changed from 0 to 1 to split the partition type 918 in operation 920, and encoding is repeatedly performed on coding units 930 having a depth of 2 and a size of N_0×N_0 to search for a minimum encoding error.

The prediction unit 940 for prediction-encoding the coding unit 930 having a depth of 1 and a size of 2N_1× 2N_1 (=N_0×N_0) may include partitions of a partition type 942 having a size of 2N_1×2N_1, a partition type 944 having a size of 2N_1×N_1, a partition type 946 having a size of N_1×2N_1, and a partition type 948 having a size of N_1×N_1.

If an encoding error is the smallest in the partition type 948, a depth is changed from 1 to 2 to split the partition type 948 in operation 950, and encoding is repeatedly performed on coding units 960, which have a depth of 2 and a size of N_2×N_2 to search for a minimum encoding error.

When a maximum depth is d, a split operation according to each depth may be performed up to when a depth becomes d−1, and split information may be encoded up to when a depth is one of 0 to d−2. In other words, when encoding is performed up to when the depth is d−1 after a coding unit corresponding to a depth of d−2 is split in operation 970, a prediction unit 990 for prediction-encoding a coding unit 980 having a depth of d−1 and a size of 2N_(d−1)×2N_(d−1) may include partitions of a partition type 992 having a size of 2N_(d−1)×2N_(d−1), a partition type 994 having a size of 2N_(d−1)×N_(d−1), a partition type 996 having a size of N_(d−1)×2N_(d−1), and a partition type 998 having a size of N_(d−1)×N_(d−1).

Prediction encoding may be repeatedly performed on one partition having a size of 2N_(d−1)×2N_(d−1), two partitions having a size of 2N_(d−1)×N_(d−1), two partitions having a size of N_(d−1)×2N_(d−1), or four partitions having a size of N_(d−1)×N_(d−1) from among the partition types 992 through 998 to search for a partition type having a minimum encoding error.

Even when the partition type 998 having a size of N_(d−1)×N_(d−1) has a minimum encoding error, since the maximum depth is d, a coding unit CU_(d−1) having a depth of d−1 is no longer split to a lower depth, and a coded depth for the coding units constituting a current maximum coding unit 900 is determined as d−1 and a partition type of the current maximum coding unit 900 may be determined as N_(d−1)× N_(d−1). Also, since the maximum depth is d, split information for the coding unit 952 having a depth of d−1 is not set.

A data unit 999 may be referred to as a 'minimum unit' for the current maximum coding unit. According to an exemplary embodiment, a minimum unit may be a rectangular data unit obtained by splitting a minimum coding unit having a lowest coded depth by 4. By performing the encoding repeatedly, the video encoding apparatus 100 may select a depth having a least encoding error by comparing encoding errors according to depths of the coding unit 900 to each other so as to determine a coded depth, and set a partition type and a prediction mode which correspond to the coded depth as an encoding mode of the coded depth.

As such, minimum encoding errors according to depths are compared in all of the depths of 0 through d, and a depth having a least encoding error may be selected and determined as a coded depth. The coded depth, the partition type of the prediction unit, and the prediction mode may be encoded and transmitted as information about an encoding mode. Also, since a coding unit is split from a depth of 0 to a coded depth, only split information of the coded depth is set to 0, and split information of depths excluding the coded depth is set to 1.

According to an exemplary embodiment, the image data and encoding information extractor 220 included in the video decoding apparatus 200 may extract and use the information about the coded depth and the prediction unit of the coding unit 900 to decode the partition 912. The video decoding apparatus 200 may determine a depth, in which split information is 0, as a coded depth by using split information according to depths, and use information about an encoding mode of the depth for decoding.

Figure 10:
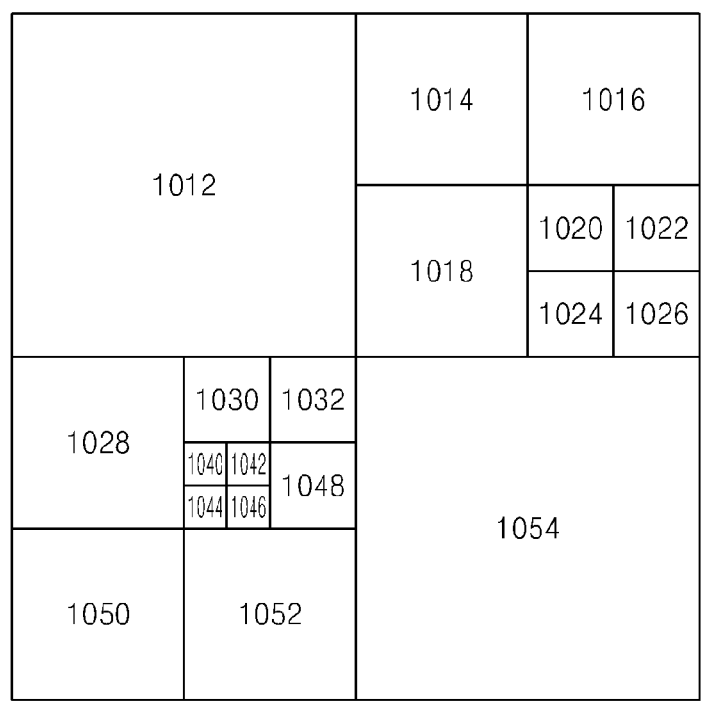
FIGS. 10 through 12 illustrate a relation between a coding unit, a prediction unit, and a transformation unit according to an exemplary embodiment.
Figure 11:
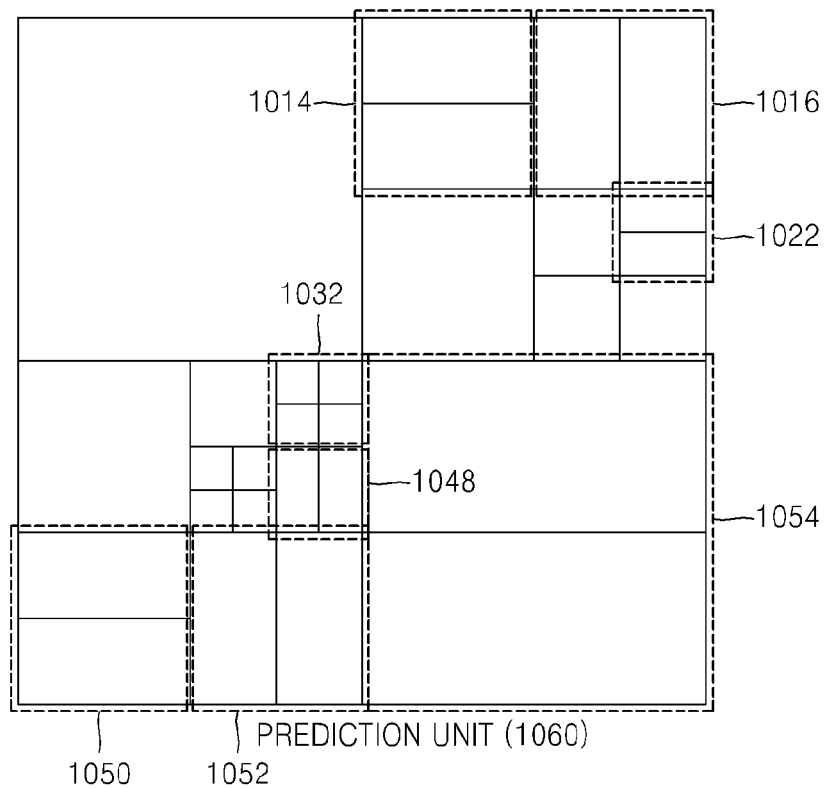
Figure 12:
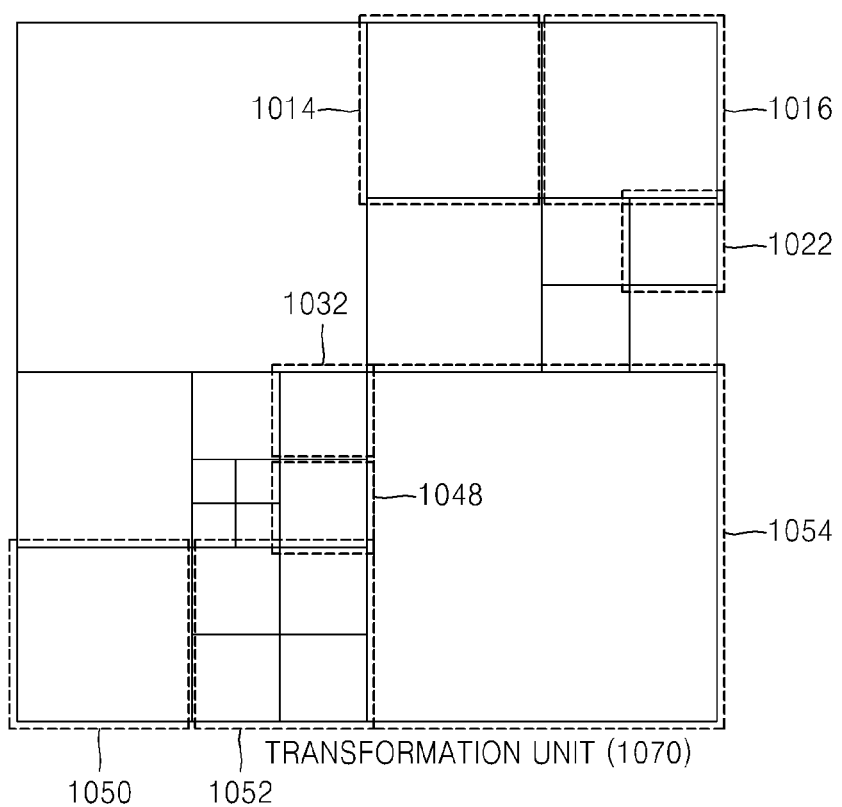

FIGS. 10 through 12 illustrate a relation between coding units 1010, prediction units 1060, and transformation units 1070, according to an exemplary embodiment.

apparatus 100 and the video decoding apparatus 200 may perform intra-prediction, motion estimation, motion compensation, frequency transformation, and frequency inverse transformation individually on a data unit in the same coding unit.

Accordingly, encoding is recursively performed on each of the coding units having a hierarchical structure in each region of a maximum coding unit to determine an optimum coding unit, and thus coding units having a recursive tree structure may be obtained. Encoding information may include split information about a coding unit, partition type information, prediction mode information, and information about a size of a transformation unit. Table 1 shows the encoding information that may be set by the video encoding apparatus 100 and the video decoding apparatus 200, according to an exemplary embodiment.

TABLE 1

| | | | Size of transformation units | | |
|---|---|---|---|---|---|
| Prediction mode | Symmetrical Partition Type | Asymmetrical Partition Type | Split Information 0 of Transformation Unit | Split Information 1 of Transformation Unit | Split information 1 |
| Intra- Inter Skip (2N × 2N only) | 2N × 2N 2N × N N × 2N N × N | 2N × nU 2N × nD nL × 2N nR × 2N | 2N × 2N | N × N (Symmetrical Type) N/2 × N/2 (Asymmetrical Type) | Repeatedly Encode Coding Units having Lower Depth of d + 1 |

According to an exemplary embodiment, the coding units 1010 are coding units according to coded depths which is determined by the video encoding apparatus 100 with respect to a maximum coding unit. The prediction units 1060 are partitions of prediction units of coding units according to depths with respect to each of the coding units 1010, and the transformation units 1070 are transformation units of coding units according to each coded depth.

When a depth of a maximum coding unit is 0 in the coding units 1010, depths of coding units 1012 and 1054 are 1, depths of coding units 1014, 1016, 1018, 1028, 1050, and 1052 are 2, depths of coding units 1020, 1022, 1024, 1026, 1030, 1032, and 1048 are 3, and depths of coding units 1040, 1042, 1044, and 1046 are 4.

The encoding units 1014, 1016, 1022, 1032, 1048, 1050, 1052, and 1054, from among the prediction units 1060, are obtained by splitting the coding units in the encoding units 1010. In other words, partition types in the coding units 1014, 1022, 1050, and 1054 have a size of 2N×N, partition types in the coding units 1016, 1048, and 1052 have a size of N×2N, and a partition type of the coding unit 1032 has a size of N×N. Prediction units and partitions of the coding units 1010 are smaller than or equal to each coding unit.

Frequency transformation or frequency inverse transformation is performed on image data of the coding unit 1052 in the transformation units 1070 in a data unit that is smaller than the coding unit 1052. Also, the coding units 1014, 1016, 1022, 1032, 1048, 1050, 1052, and 1054 in the transformation units 1070 are different from those in the prediction units 1060 in terms of sizes and shapes. In other words, according to an exemplary embodiment, the video encoding According to an exemplary embodiment, the output unit 130 included in the video encoding apparatus 100 may output encoding information about the coding units having a tree structure, and the image data and encoding information extractor 220 included in the video decoding apparatus 200 may extract the encoding information about the coding units having a tree structure from a received bitstream.

Split information indicates whether a current coding unit is split into coding units of a lower depth. If split information of a current depth d is 0, a depth, in which a current coding unit is no longer split into a lower depth, is a coded depth, and thus partition type information, prediction mode information, and information about a size of a transformation unit may be defined for the coded depth. If the current coding unit is further split according to the split information, encoding is independently performed on four split coding units of a lower depth.

A prediction mode may be represented as one of an intra-mode, an inter-mode, and a skip mode. The intra-mode and the inter-mode may be defined in all partition types, and the skip mode is defined only in a partition type having a size of 2N×2N.

Partition type information may indicate symmetrical partition types having sizes of 2N×2N, 2N×N, N×2N, and N×N, which are obtained by symmetrically splitting a height or a width of a prediction unit, and asymmetrical partition types having sizes of 2N×nU, 2N×nD, nL×2N, and nR×2N, which are obtained by asymmetrically splitting the height or width of the prediction unit. The asymmetrical partition types having the sizes of 2N×nU and 2N×nD may be respectively obtained by splitting a height of the prediction unit in a ratio of 1:3 and 3:1, and the asymmetrical partition types having a sizes of nL×2N and nR×2N may be respectively obtained by splitting a width of the prediction unit in a ratio of 1:3 and 3:1

A size of a transformation unit may be set to be two types in the intra-mode and two types in the inter-mode. In other words, if split information of the transformation unit is 0, a size of a transformation unit may be 2N×2N, which is a size of the current coding unit. If split information of the transformation unit is 1, the transformation units may be obtained by splitting the current coding unit. Also, if a partition type of the current coding unit having a size of 2N×2N is a symmetrical partition type, a size of a transformation unit may be N×N, and if a partition type of the current coding unit is an asymmetrical partition type, a size of a transformation unit may be N/2×N/2.

According to an exemplary embodiment, the encoding information about coding units having a tree structure may be allocated to at least one of a coding unit corresponding to a coded depth, a prediction unit, and a minimum unit. The coding unit corresponding to the coded depth may include one or more prediction units and minimum units which contain the same encoding information.

Accordingly, an exemplary embodiment enables the checking of whether adjacent data units are included in a same coding unit of the coded depth by comparing encoding information of the adjacent data units to each other. Also, a coding unit of a coded depth, corresponding to the data unit, may be checked by using encoding information of a data unit, and thus a distribution of coded depths in a maximum coding unit may be inferred.

Accordingly, in this case, if a current coding unit is predicted with reference to adjacent data units, encoding information of data units in coding units according to depths which is adjacent to the current coding unit may be directly referred to and used.

According to another exemplary embodiment, if prediction encoding is performed on a current coding unit with reference to adjacent data units, data units adjacent to the current coding unit are searched using encoded information of the data units, and the searched adjacent coding units may be referred to for predicting the current coding unit.

Figure 13:
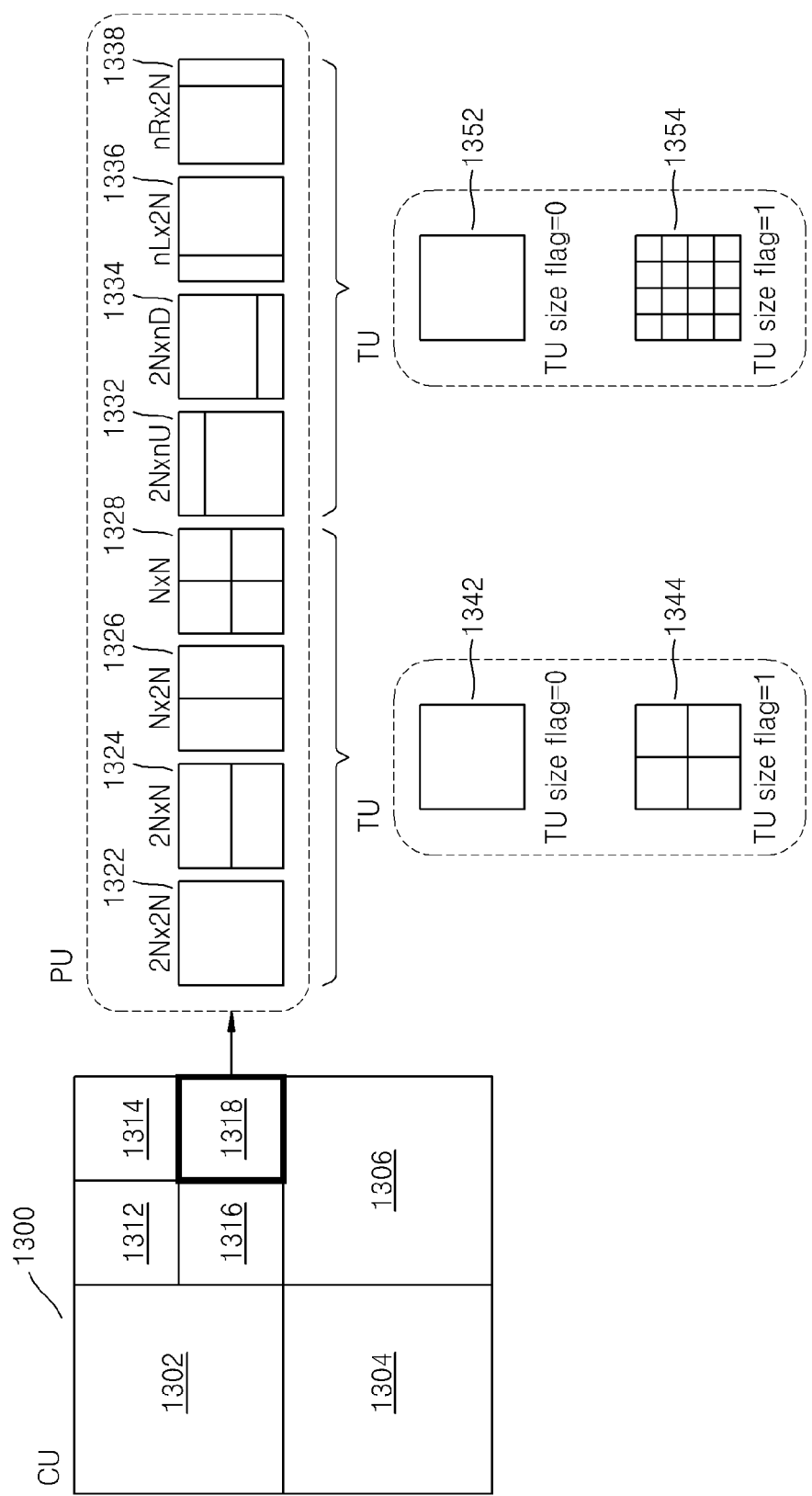
FIG. 13 illustrates a relation between a coding unit, a prediction unit, and a conversion unit according to encoding mode information shown in Table 1.

FIG. 13 illustrates a relation between a coding unit, a prediction unit, and a transformation unit, according to encoding mode information shown in Table 1.

A maximum coding unit 1300 includes coding units 1302, 1304, 1306, 1312, 1314, 1316, and 1318 of coded depths. Since the coding unit 1318 is a coding unit of a coded depth, split information thereof may be set to 0. Partition type information of the coding unit 1318 having a size of 2N×2N may be set to one of a partition type 1322 having a size of 2N×2N, a partition type 1324 having a size of 2N×N, a partition type 1326 having a size of N×2N, a partition type 1328 having a size of N×N, a partition type 1332 having a size of 2N×nU, a partition type 1334 having a size of 2N×nD, a partition type 1336 having a size of nL×2N, and a partition type 1338 having a size of nR×2N.

When partition type information is set to one of the partition type having a size of 2N×2N, the partition type 1324 having a size of 2N×N, the partition type 1326 having a size of N×2N, and the partition type 1328 having a size of N×N, a transformation unit 1342 having a size of 2N×2N is set if split information (TU size flag) of a transformation unit is 0, and a transformation unit 1344 having a size of N×N is set if a TU size flag is 1.

When the partition type is set to one of the partition type 1332 having a size of 2N×nU, the partition type 1334 having a size of 2N×nD, the partition type 1336 having a size of nL×2N, and the partition type 1338 having a size of nR×2N, a transformation unit 1352 having a size of 2N×2N is set if a TU size flag is 0, and a transformation unit 1354 having a size of N/2×N/2 is set if a TU size flag is 1.

Hereinafter, according to exemplary embodiments, referring to FIGS. 14 through 24, a scalable video encoding method and a scalable video decoding method are described in detail.

Figure 14:
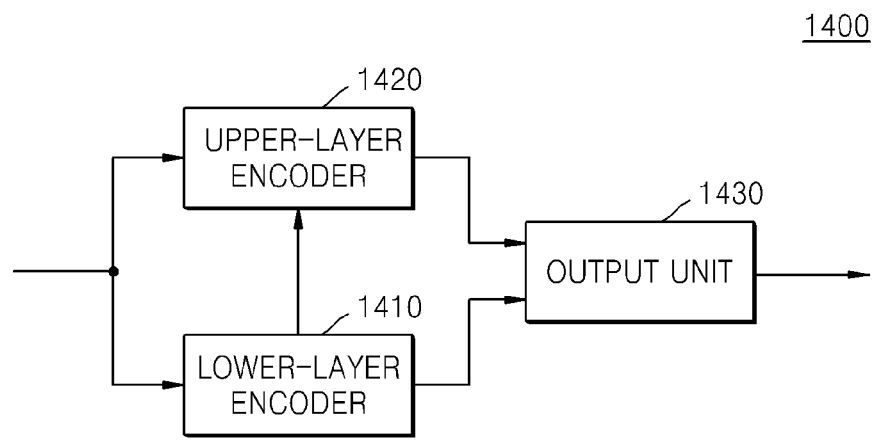
FIG. 14 is a block diagram of a scalable video encoding apparatus according to an exemplary embodiment.

FIG. 14 is a block diagram of a scalable video coding apparatus 1400 according to an exemplary embodiment.

The scalable video decoding apparatus 1400 classifies an input image into a base layer image sequence and an enhancement layer image sequence, and generates and outputs a scalable bitstream by encoding the base layer image sequence and the enhancement layer image sequence. In order to provide optimum service in various network environments by using various terminals, the scalable video encoding apparatus 1400 outputs a scalable bitstream that includes various spatial resolutions, various qualities, and various frame rates, so that various terminals receive and restore a bitstream of a particular layer according to a capability of each terminal. Hereinafter, a base layer image may be referred to as a lower-layer image, and an enhancement layer may be referred to as an upper-layer image. Additionally, a case when a lower-resolution image is classified as a lower-layer image and a high-resolution image is classified as an upper-layer image according to a spatial resolution of an image, and an input image is scalably encoded, is described.

According to an exemplary embodiment, referring to FIG. 14, the scalable video encoding apparatus 1400 includes a lower-layer encoder 1410, an upper-layer encoder 1420, and an output unit 1430 (e.g., outputter).

The lower-layer encoder 1410 encodes a lower-layer image. The lower-layer encoder 1410 may encode a lower-layer image based on coding units having a tree structure which is described with reference to FIGS. 1 through 13. In other words, the lower-layer encoder 1410 may encode a lower-layer image by splitting a lower-layer image into maximum encoding units, and determining an encoding mode of the coding units that are obtained by hierarchically splitting the maximum coding units. Additionally, the lower-layer encoding unit 1410 determines and outputs an optimum prediction unit and a transformation unit for transformation with respect to each encoding unit.

The upper-layer encoder 1420 decodes an upper-layer image. The upper-layer encoder 1420 may encode an upper-layer image based on coding units having a tree structure. Additionally, the upper-layer encoder 1420 may prediction-encode an upper-layer image with reference to encoding information of a lower-layer image that is encoded, and then, restored by the lower-layer encoder 1410. The upper-layer encoder 1420 may encode an upper-layer image, with reference to structure information of a coding unit of a lower-layer image, structure information of a prediction unit included in a coding unit of a lower-layer image, and structure information and motion information of a transformation unit.

As such, a mode of prediction-encoding an upper-layer image with reference to encoding information of a lower-layer image is defined as an inter-layer prediction mode. The upper-layer encoder 1420 may prediction-encode an upper-layer image without having to refer to encoding information of a lower-layer image.

As to be described later, according to an exemplary embodiment, the upper-layer encoder 1420 may split a maximum coding unit of an upper-layer image into coding units having a tree structure, based on a split structure of a maximum coding unit of a lower-layer image. Additionally, the upper-layer encoder 1420 may split a data unit of an obtained upper-layer image into a smaller data unit, based on a split structure of a lower-layer image. A data unit represents one of a maximum coding unit, a coding unit, a prediction unit, and a transformation unit. For example, the upper-layer encoder 1420 may determine a structure of a prediction unit included in a coding unit of an upper-layer image, based on structure information of a prediction unit included in a coding unit of a lower-layer image. Additionally, the upper-layer encoder 1420 may compare a first cost obtained as a result of prediction-encoding the upper-layer image by using a data unit included in an initial split structure of the upper-layer image that is obtained based on the split information of the lower-layer image, and a second cost obtained as a result of prediction-encoding the upper-layer image by additionally splitting the data unit included in the initial split structure of the upper-layer image, and thus, determine whether to additionally split the data unit of the upper-layer image.

The output unit 1430 outputs encoding information regarding the lower-layer image according to a result of the encoding performed by the lower-layer encoder 1410. Additionally, the output unit 1430 may output encoding information regarding the upper-layer image according to a result of the encoding performed by the upper-layer encoder 1420. The encoding information may include various types of information regarding encoding, such as structure information of a maximum encoding unit constituting the lower-layer image and the upper-layer image, structure information of a prediction unit, structure information of a transformation unit, prediction mode information of a prediction mode, and the like. Particularly, if a split structure of the upper-layer image is obtained based on a split structure of the lower-layer image according to an inter-layer prediction method, encoding information of the upper-layer image may include first flag information that is a BL_Split flag which indicates whether the split structure of the lower-layer image is used. Additionally, encoding information of the upper-layer image may include second flag information (Further_Split flag) which indicates whether a data unit included in the split structure of the upper-layer image, obtained based on the split structure of the lower-layer image, is to be additionally split.

Figure 15:
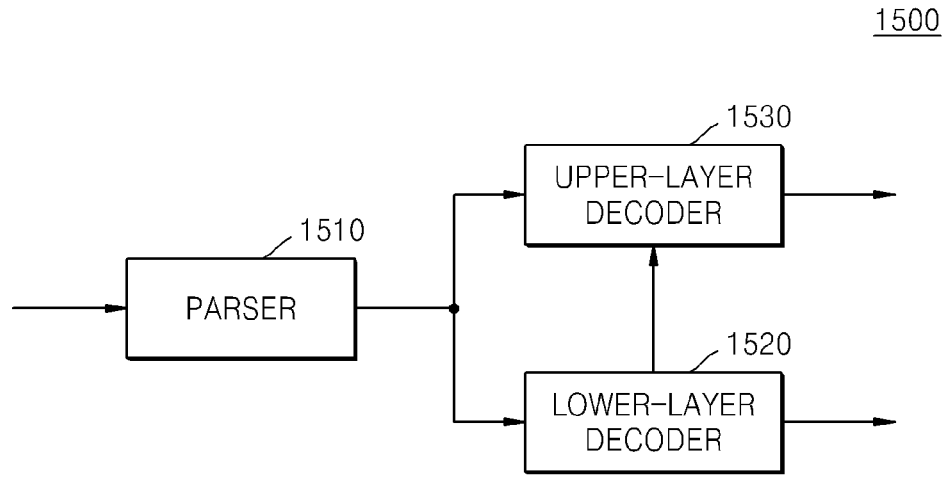
FIG. 15 is a block diagram of a scalable video decoding apparatus according to an exemplary embodiment.

FIG. 15 is a block diagram of a scalable video coding apparatus 1500 according to an exemplary embodiment.

The scalable video encoding apparatus 1500 includes a parser 1510, a lower-layer decoder 1520, and an upper-layer decoder 1530.

The parser 1510 parses encoding information of a lower-layer image and encoding information of an upper-layer image from a received bitstream.

The lower-layer decoder 1520 decodes a lower-layer image based on encoding information of the parsed lower-layer image. The lower-layer decoder 1520 may perform decoding on each maximum decoding unit by determining an encoding unit having a tree structure which is obtained by splitting each maximum encoding unit of the lower-layer image, and generating a prediction value of each encoding unit according to a prediction mode of each encoding unit.

The upper-layer decoder 130 decodes an upper-layer image based on encoding information of the upper-layer image. The upper-layer decoder 1530 may decode an upper-layer image based on encoding units having a tree structure.

Particularly, the upper-layer decoder 1420 may obtain first flag information that is a BL_Split flag from a bitstream, wherein the first flag information indicates whether a split structure of a maximum encoding unit of the upper-layer image is determined based on a split structure of a maximum encoding unit of the lower-layer image. Then, based on the obtained first flag information, the upper-layer decoder 1420 may determine whether a split structure of a maximum coding unit, a split structure of a prediction unit, and a split structure of a transformation unit which are included the lower-layer image are used to determine a split structure of a maximum encoding unit, a structure of a prediction unit included in the coding unit, and a structure of a transformation unit with respect to the upper-layer image. Additionally, the upper-layer decoder 1530 may determine whether to additionally split a data unit of the upper-layer image obtained based on the split structure of the lower-layer image, based on second flag information (Further_Split flag) which indicates whether a data unit of the upper-layer image, obtained from a bitstream, is to be split into a smaller data unit.

When a structure of the coding unit, a structure of a prediction unit, and a structure of a transformation unit which are included in the upper-layer image are determined based on the first and second flag information obtained from the bitstream, the upper-layer decoder 1530 may obtain encoding information necessary for decoding the upper-layer image with reference to encoding information of the lower-layer image, and decode the upper-layer image by using the obtained encoding information. For example, the upper-layer decoder 1530 may obtain prediction mode information and motion information, which is to be applied to a prediction unit of an upper layer, based on the prediction mode information and motion information of the prediction unit of the lower layer which corresponds to a prediction unit of an upper layer that is currently being decoded, and decode a prediction unit of the upper layer, with reference to the obtained prediction mode information and motion information.

The upper-layer decoder 1530 may modify encoding information derived from the lower-layer image, and determine encoding information of the upper-layer image by using the modified encoding information. The upper-layer decoder 1530 may use the encoding information of the upper-layer image which is determined based on the encoding information of the lower-layer image. Alternately, the upper-layer decoder 1530 may change the encoding information of the upper-layer image, which is determined based on the encoding information of the lower-layer image, based on change information obtained from a bitstream and use the changed encoding information to decode the upper-layer image. For example, the upper-layer decoder 1530 may obtain an initial motion vector of a current prediction unit of the upper layer based on a motion vector of a prediction unit of the lower layer, modify the initial motion vector based on modified motion vector information included in the bitstream, and thus, obtain a final motion vector that is to be applied to the current prediction unit of the upper layer.

Figure 16:
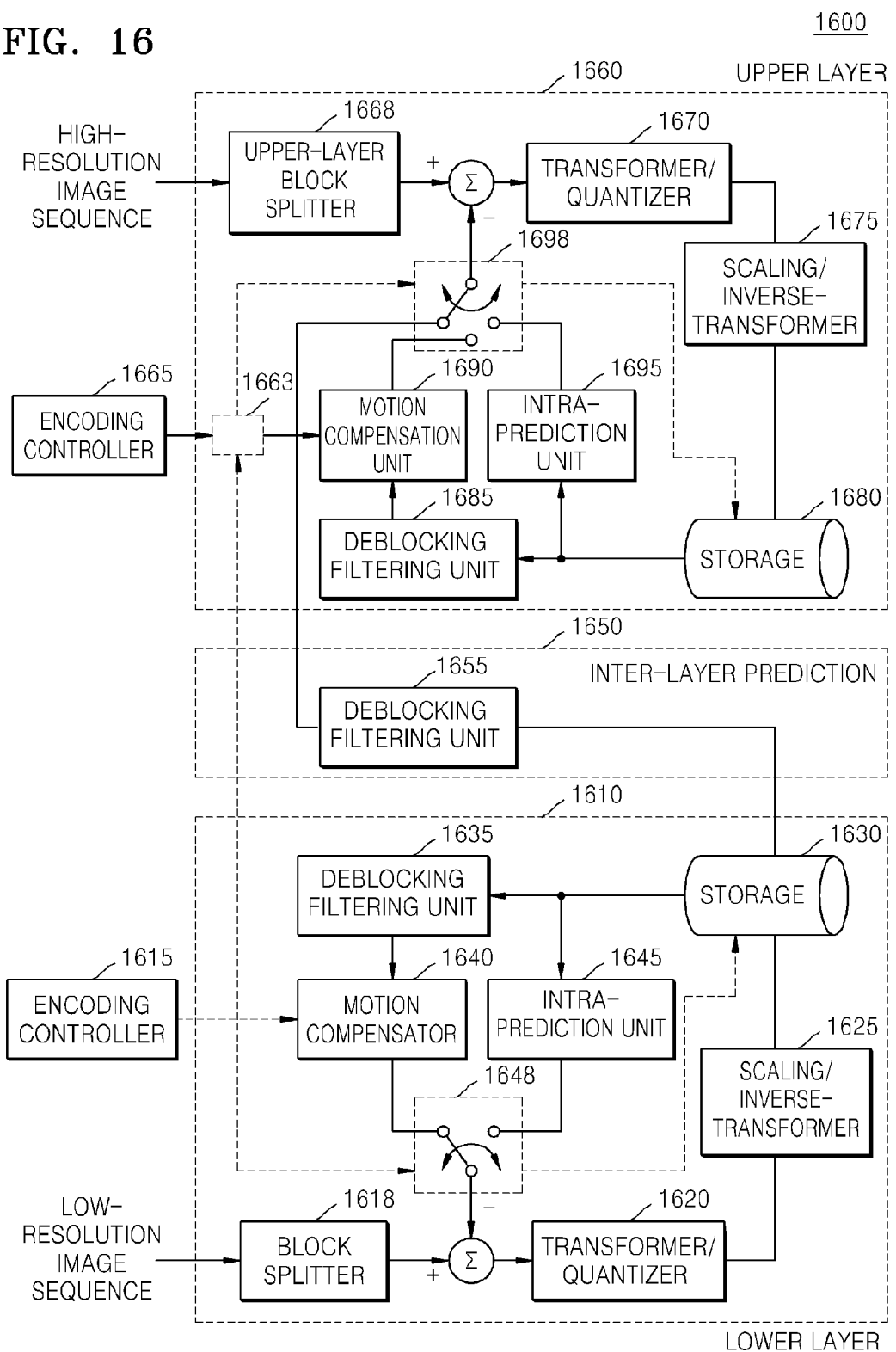
FIG. 16 is a detailed block diagram of the scalable video encoding apparatus according to an exemplary embodiment.

FIG. 16 is a detailed block diagram of a scalable video encoding apparatus 600 according to an exemplary embodiment.

The scalable encoding apparatus 1600 includes a lower-layer encoding apparatus 1610, an upper-layer encoding apparatus 1660, and an inter-layer prediction apparatus 1650. The lower-layer encoding apparatus 1610 and the upper-layer encoding apparatus 1660 may correspond respectively to the lower-layer encoding apparatus 1410 and the upper-layer encoding apparatus 1420, shown in FIG. 14.

A lower-layer block splitter 1618 splits a lower-layer image into data units such as a maximum encoding unit, a coding unit, a prediction unit, and a transformation unit. Intra-prediction or inter-prediction may be performed on a prediction unit included in a coding unit that is output from the block splitter 1618. A motion compensation unit 1640 (e.g., motion compensator) outputs a prediction value of a prediction unit by performing inter-prediction on the prediction unit, and an intra-prediction unit 1645 (e.g., intra-predictor) outputs a prediction value of a prediction unit by performing intra-prediction on the prediction unit. An encoding controller 1615 determines a prediction mode that is used to obtain a prediction value that is most similar to a prediction value of a current prediction unit, from among the intra-prediction mode and the inter-prediction mode, and controls a prediction switch so that a prediction value according to the determined prediction mode is output. A residual that is a value of difference between a prediction value of the current prediction unit which is obtained through the intra-prediction or the inter-prediction and the current prediction unit is transformed and quantized by a transformer/quantizer 1620, and thus, the quantized transformation coefficient is output. A scaling/inverse-transformer 1625 restores a residual by performing scaling and inverse-transformation on the quantized transformation coefficient. A storage 1630 adds the stored residual to the prediction value of the current prediction unit, and restores and stores the current prediction unit. An encoding process is repeatedly performed on each coding unit of the lower-layer image split by the block splitter 1618. According to the process of encoding the lower-layer image, a structure of a maximum coding unit, a coding unit, a prediction unit, and a transformation unit with respect to a lower-layer image that contains a minimum cost may be determined. A deblocking filtering unit 1635 (e.g., deblocking filter) reduces an artifact included in the restored lower-layer image, by filtering the restored lower-layer image.

The inter-layer prediction apparatus 1650 outputs lower-layer image information to the upper-layer encoding apparatus so that the lower-layer image is used for prediction-encoding the upper-layer image. The deblocking filtering unit 1655 (e.g., deblocking filter) included in the inter-layer prediction apparatus 1650 performs deblocking filtering on the lower-layer image that is encoded and then restored, and outputs the lower-layer image on which the deblocking filtering is performed to the upper-layer encoding apparatus 1680.

The upper-layer encoding apparatus 1660 encodes the upper-layer image based on encoding information of the lower-layer image that is encoded by the lower-layer encoding apparatus 1610. The upper-layer encoding apparatus 1660 may apply the encoding information of the lower-layer image which is determined by the lower-layer encoding apparatus 1610 to encoding of the upper-layer image, or determine encoding information that is to be applied to encoding of the upper-layer image by changing the encoding information of the lower-layer image.

The upper-layer block splitter 1668 splits an upper-layer image into data units such as a maximum encoding unit, a coding unit, a prediction unit, a transformation unit, and the like. The upper-layer block splitter 1668 may determine a structure of a data unit of an upper-layer image corresponding to the lower-layer image, based on structure information of the data unit such as the maximum coding unit, the coding unit, the prediction unit, and the transformation unit which are determined with respect to the lower-layer image.

Intra-prediction or inter-prediction may be performed on a prediction unit included in a coding unit of an upper layer that is output from the block splitter 1668. The motion compensation unit 1690 outputs a prediction value by performing inter-prediction on a current prediction unit, and the intra-prediction unit 1695 (e.g., intra-predictor) outputs a prediction value by performing intra-prediction on the current prediction unit. The motion compensation unit 1690 (e.g., motion compensator) may determine a motion vector of the prediction unit of the upper layer by performing scaling on a motion vector of the prediction unit of the lower layer which corresponds to the prediction unit of the upper layer. For example, if a lower-layer image has a resolution of a*b (where a and b are integers) and an upper-layer image corresponding to the lower-layer image has a resolution of 2a×2b, and if a motion vector of a prediction unit of the lower layer is mv_base, 2×mv_base may be determined as a motion vector of a prediction unit of the upper layer, wherein 2×mv_base is obtained as a motion vector is scaled in correspondence with twice the motion vector of the prediction unit of the lower layer according to a resolution ratio between the lower-layer image and the upper-layer image.

An encoding controller 1665 determines a prediction mode that has a prediction value which is most similar to a prediction value of a current prediction unit of an upper layer, from among the intra-prediction mode and the inter-prediction mode, and controls a prediction switch 1698 so that a prediction value of the current prediction unit according to the determined prediction mode is output. A residual that is a value of a difference between a prediction value obtained through the intra-prediction or the inter-prediction and a prediction value of the current prediction unit is transformed and quantized by a transformer/quantizer 1670, and thus, the quantized transformation coefficient is output. A scaling/inverse-transformer 1675 restores a residual by performing scaling and inverse-transformation on the quantized transformation coefficient. A storage 1680 adds the stored residual to the prediction value of the current prediction unit, and restores and stores the current prediction unit. A deblocking filtering unit 1685 performs deblocking filtering on the restored lower-layer image.

Figure 17:
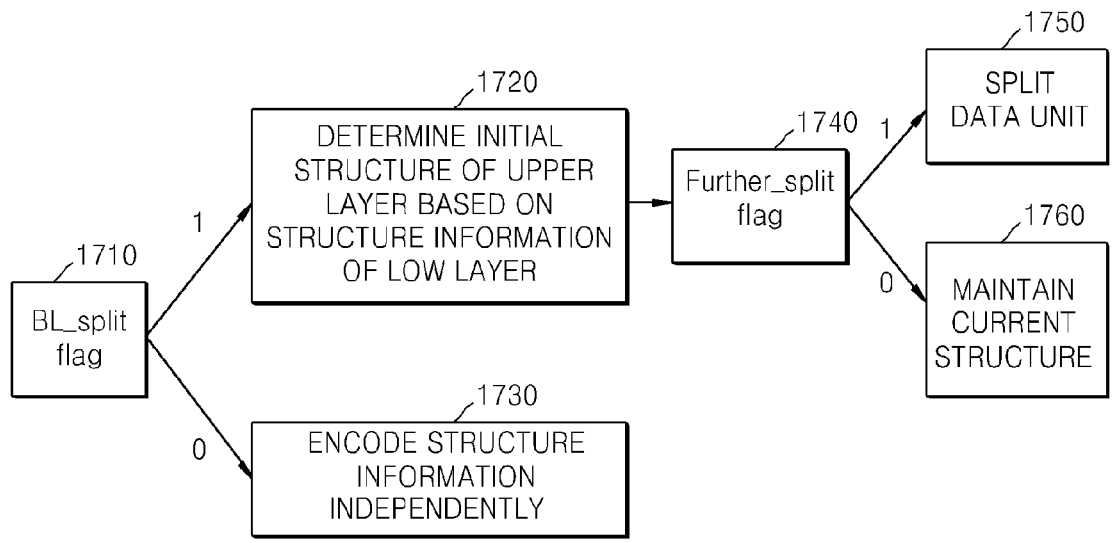
FIG. 17 illustrates a method of setting flag information used to determine a split structure of an upper-layer image that is used for inter-layer prediction according to an exemplary embodiment.

FIG. 17 illustrates a method of setting flag information used to determine a split structure of an upper-layer image that is used to predict an inter-layer according to an exemplary embodiment.

Referring to FIG. 17, in operation 1710, a first flag (BL_Split flag), which indicates whether a split structure of an upper-layer image is determined based on a split structure of a lower-layer image, is set. In operation 1720, if the first flag (BL_Split flag) is 1, an initial structure of an upper layer is determined based on structure information of the lower-layer image. In other words, if the first flag (BL_Split flag) is 1, a coding unit, a prediction unit, and a transformation unit which are obtained by splitting a maximum coding unit of the upper-layer image is determined to be like a structure of a coding unit, a prediction unit, and a transformation unit which are obtained by splitting a maximum coding unit of the lower-layer image.

Additionally, if the first flag (BL_Split flag) is 1, it is indicated that the coding unit, the prediction unit, and the transformation unit included in the maximum coding unit in the upper-layer image may be respectively split into smaller data units. Whether each of the coding unit, the prediction unit, and the transformation unit is split into a smaller data unit may be indicated via a second flag (Further_Split flag) which is set with respect to each data unit. If the first flag (BL_Split flag) is 0, a split structure of an upper layer is independently encoded without having to refer to split structure information of the lower-layer image in operation 1730. If the first flag (BL_Split flag) is 1, the second flag (Further_Split flag), which indicates whether a data unit included in an initial split structure of the upper-layer image which is determined based on the structure information of the lower-layer image is to be split into smaller data units, is set in operation 1750. If the first flag (BL_Split flag) is 0, a data unit of the upper layer is not split, and a structure of a data unit determined based on split structure information of the lower-layer image is maintained in operation 1760.

Figure 18:
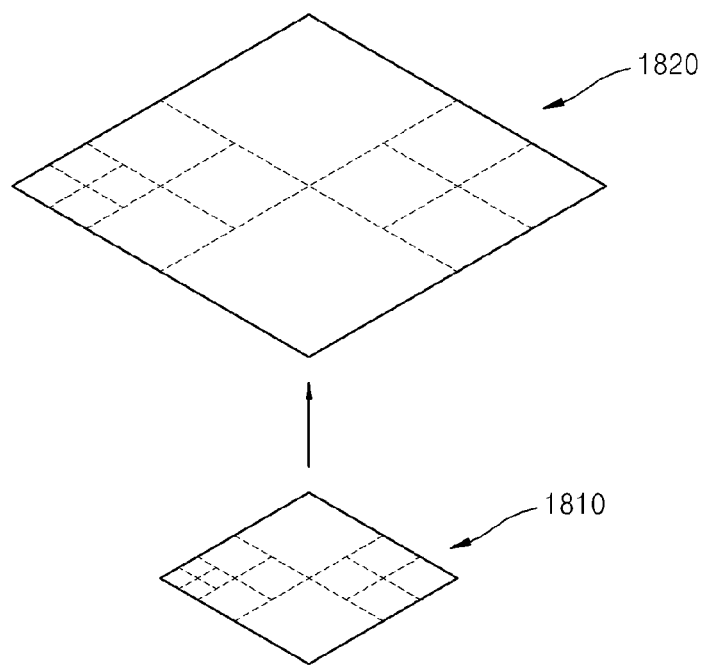
FIG. 18 illustrates an example of determining a split structure of an upper-layer image based on split structure information of a lower-layer image according to an exemplary embodiment.

FIG. 18 illustrates an example of determining a split structure of an upper-layer image based on split structure information of a lower-layer image according to an exemplary embodiment.

The upper-layer encoder 1420 may determine a split structure of a data unit, which is included in a maximum coding unit 1820 of an upper-layer image that corresponds to the lower-layer image, based on a split structure of the data unit included in the maximum encoding unit 1810 of the lower-layer image.

The upper-layer encoder 1420 may determine a first flag (BL_Split flag) with respect to each maximum encoding unit of the upper-layer image. If the upper-layer encoder 1420 determines a split structure of the data unit, included in the maximum coding unit 1820 of the upper-layer image that corresponds to the lower-layer image, based on the split structure of the data unit included in the maximum encoding unit 1810 of the lower-layer image, the upper-layer encoder 1420 may set the first flag (BL_Split flag) to 1, and include the first flag in coding information of the maximum coding unit 1820 of the upper-layer image, and transmit the coding information.

If the first flag (BL_Split flag) is set to 1, data units included in the maximum encoding unit of the upper-layer image, that is, a coding unit, a prediction unit, and a transformation unit, may be split respectively into smaller data units. As described above, whether each data unit is actually split into smaller data units may be indicated through the second flag (Further_Split flag) which is set with respect to the data unit.

The upper-layer encoder 1420 compares a first cost obtained as a result of prediction-encoding the upper-layer image by using a data unit included in an initial split structure of the upper-layer image that is determined based on the split information of the lower-layer image, to a second cost obtained as a result of prediction-encoding the upper-layer image by splitting the data unit included in the initial split structure of the upper-layer image into smaller data units. If the second cost is smaller than the first cost, the upper-layer encoding unit 1420 splits a data unit included in the initial split structure of the upper-layer image into smaller data units, and otherwise, does not split the data unit included in the initial split structure of the upper-layer image into smaller data units. Additionally, the upper-layer encoding unit 1420 sets the second flag (Further_Split flag) to 1 with respect to a data unit of the split upper-layer image, and outputs information of the set second flag. If the initial split structure with respect to the data unit of the upper-layer image is maintained, the upper-layer encoding unit 1420 sets the second flag to 0.

The upper-layer decoder 1530 obtains first flag information from a bitstream, and determines an initial split structure of the maximum coding unit of the upper-layer image based on the split structure of the maximum coding unit of the lower-layer image. The upper-layer decoder 1530 obtains second flag information, which indicates whether a data unit included in the maximum coding unit of the upper-layer image is to be split into smaller data units, from the bitstream. The upper-layer decoder 1530 may determine a final structure of the data unit included in the maximum coding unit of the upper-layer image by determining whether a data unit of the upper-layer image is to be split based on the second flag information. Additionally, the upper-layer decoder 1530 may decode the upper-layer image with reference to encoding information of the lower-layer image.

Hereinafter, referring to FIGS. 19 through 21, a method of determining a second flag and a method of prediction-encoding an upper-layer image are described in detail.

As described above, a second flag indicates whether a data unit in the upper-layer image is to be additionally split. The second flag may be set at a level of a coding unit, a prediction unit, and a transformation unit of the upper-layer image.

Figure 19:
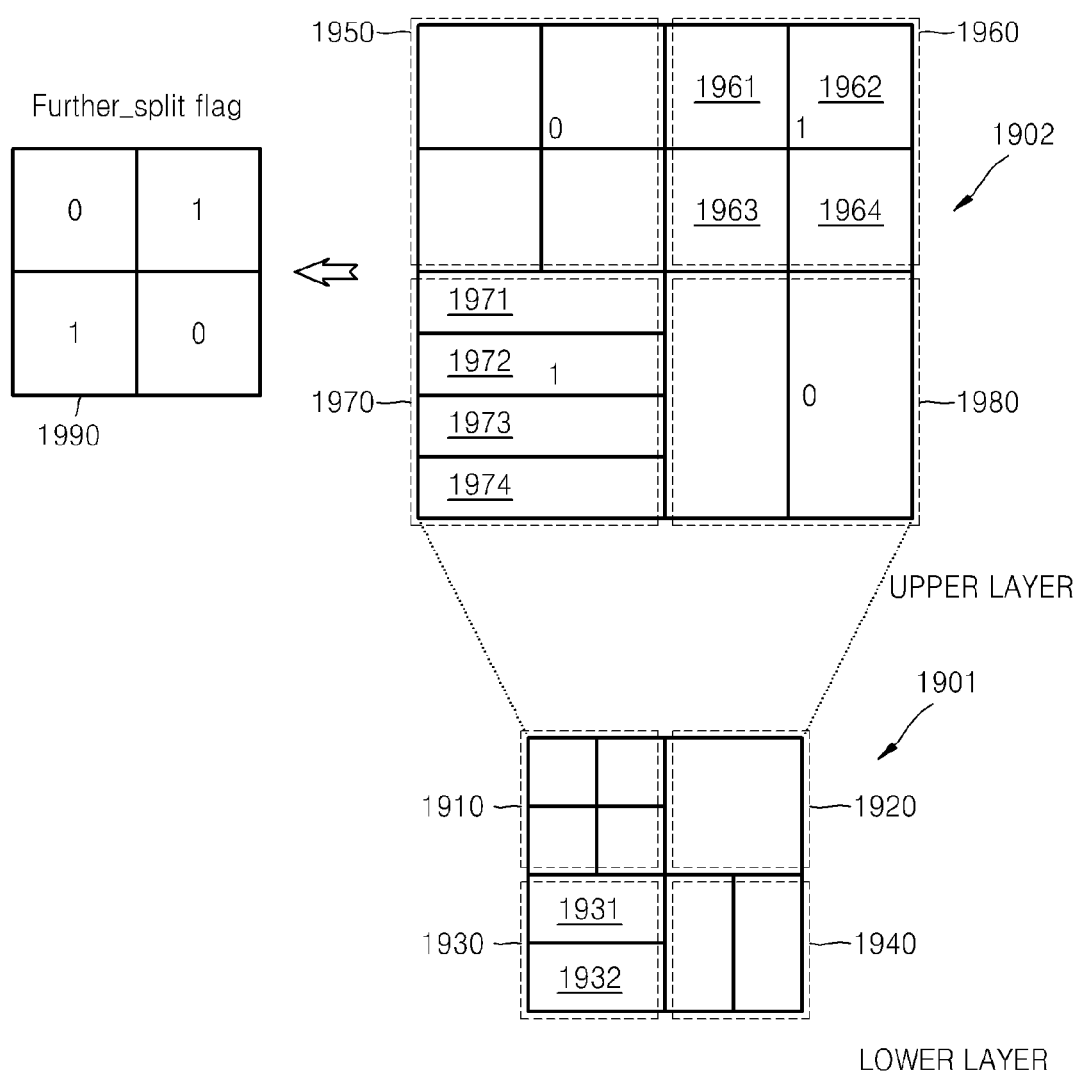
FIG. 19 illustrates an example of determining a second flag (Further_Split flag), which indicates whether a data unit of an upper-layer image is to be additionally split, at a level of a coding unit according to an exemplary embodiment.

FIG. 19 illustrates an example of determining a second flag (Further_Split flag), which indicates whether a data unit of an upper-layer image is to be additionally split, at a level of a coding unit according to an exemplary embodiment. In FIG. 19, a rectangle shown in a dotted line indicates a coding unit, and a solid line in a coding unit indicates a boundary between prediction units. Additionally, as shown in FIG. 19, it is assumed that a final split structure of a coding unit is determined with respect to a maximum coding unit 1901 of a lower-layer image and a maximum coding unit 1902 of an upper-layer image. As described above, a final split structure of the upper-layer image may be determined by comparing a cost in which a data unit is split to a cost in which the data unit is not split, wherein the data unit is included in an initial split structure determined based on a split structure of a lower-layer image, and splitting the data unit if the cost in which the data unit is split is smaller than the cost in which the data unit is not split and maintaining the initial split structure if the cost in which the data unit is not split is smaller than the cost in which the data unit is split.

Referring to FIG. 19, a coding unit 1960 of an upper layer which corresponds to a coding unit 1920 of a lower layer is split into smaller prediction units 1961 through 1964. Accordingly, the upper-layer encoder 1420 sets a second flag (Further_Split flag) of the upper layer to 1. Similarly, two prediction units 1931 and 1932 which are included in a coding unit 1930 of the lower layer is split into four prediction units 1971 through 1974. Accordingly, the upper-layer encoder 1420 sets the second flag (Further_Split flag) of the upper layer to 1. Since coding units 1910 and 1940 of the lower layer and coding units of the upper layer have a same split shape, the second flag is set to 0. As such, second flag information 1990 of a coding unit included in a maximum coding unit of the upper-layer image may be obtained by setting a second flag of the coding unit to 1 if a prediction unit included in a coding unit of an upper layer is split into smaller prediction units, and setting the second flag of the coding unit to 0 if an initial split structure is maintained.

By using a first splitting method, a prediction unit of the upper-layer image may be split into smaller prediction units according to a predetermined rule. For example, a quadtree splitting method may be predetermined as a method of splitting a prediction unit of the upper-layer image. Additionally, by using a second splitting method, a direction in which a prediction unit of the upper-layer image is split may be determined based on a size of the prediction unit before the prediction unit is split. For example, referring to FIG. 19, two prediction units 1931 and 1932 included in the coding unit 1930 of the lower-layer image are obtained by splitting the coding unit 1930, and thus, have a shape in which a width is longer than a height. Accordingly, as shown in FIG. 19, prediction units, included in a coding unit 1970 of the upper-layer image corresponding to the lower-layer image, are split in a horizontal direction into four prediction units 1971 through 1974, and thus, have a shape in which a width is longer than a height. Additionally, by using a third splitting method, a prediction unit of the upper-layer image may be split into smaller prediction units, based on image characteristics of a prediction unit of the lower-layer image. For example, an edge direction included in a prediction unit of a lower-layer image is detected, and a prediction unit of an upper-layer image corresponding to the lower-layer image may be split into smaller predictions based on the edge direction. Additionally, if an area of a prediction unit of a lower-layer image is homogenous and another area of the prediction unit contains a high-frequency element, a prediction unit of the lower-layer image is split with reference to a boundary between the homogenous area and the area containing a high-frequency element, and a prediction unit of the upper-layer image corresponding to the lower-layer image may be split based on a boundary determined with respect to the prediction unit of the lower-layer image.

The upper-layer encoder 1420 may determine a motion vector of a prediction unit of an upper-layer image corresponding to a lower-layer image, based on a motion vector of a prediction unit of the lower-layer image. In detail, the upper-layer encoder 1420 may scale a motion vector of the prediction unit of the lower-layer image in a ratio of a resolution between the lower-layer image and the upper-layer image, and determine a motion vector obtained by the scaling as a motion vector of a prediction unit of the upper-layer image. Additionally, if a prediction unit of the upper-layer image is split into smaller prediction units, the upper-layer encoder 1420 may use a motion vector that is scaled as a motion vector of a smaller prediction unit or a motion vector that is modified in a certain range. For example, referring to FIG. 19, if a motion vector of the prediction unit 1920 of the lower-layer image is scaled_MV, a modified motion vector scaled_MV' may be obtained by performing a re-search for the prediction units 1961 through 1964 within a certain search scope of a reference frame that is determined based on scaled_MV, or by adding a certain constant value to scaled_MV', as a motion vector of the prediction units 1961 through 1964 of an upper-layer image corresponding to the prediction unit 1920, so that the modified motion vector scaled_MV' is used as a motion vector of the prediction units 1961 through 1964. A value of a difference between the motion vector scaled_MV that is obtained by scaling a motion vector of a prediction unit of a lower-layer image and the modified motion vector scaled_MV' may be transmitted as motion vector information of the prediction units 1961 through 1964. Syntax information indicating a motion vector that is to be used as a motion vector of a prediction unit of the upper-layer image, from among the motion vector scaled_MV that is obtained by scaling a motion vector of a prediction unit of a lower-layer image and the modified motion vector scaled_MV', may be included in motion vector information of a prediction unit of the upper-layer image.

The upper-layer encoder 1420 may determine a structure of a transformation unit included in a coding unit of the upper-layer image that corresponds to a lower-layer image, based on structure information of a transformation unit included in a coding unit of the lower-layer image.

Figure 20:
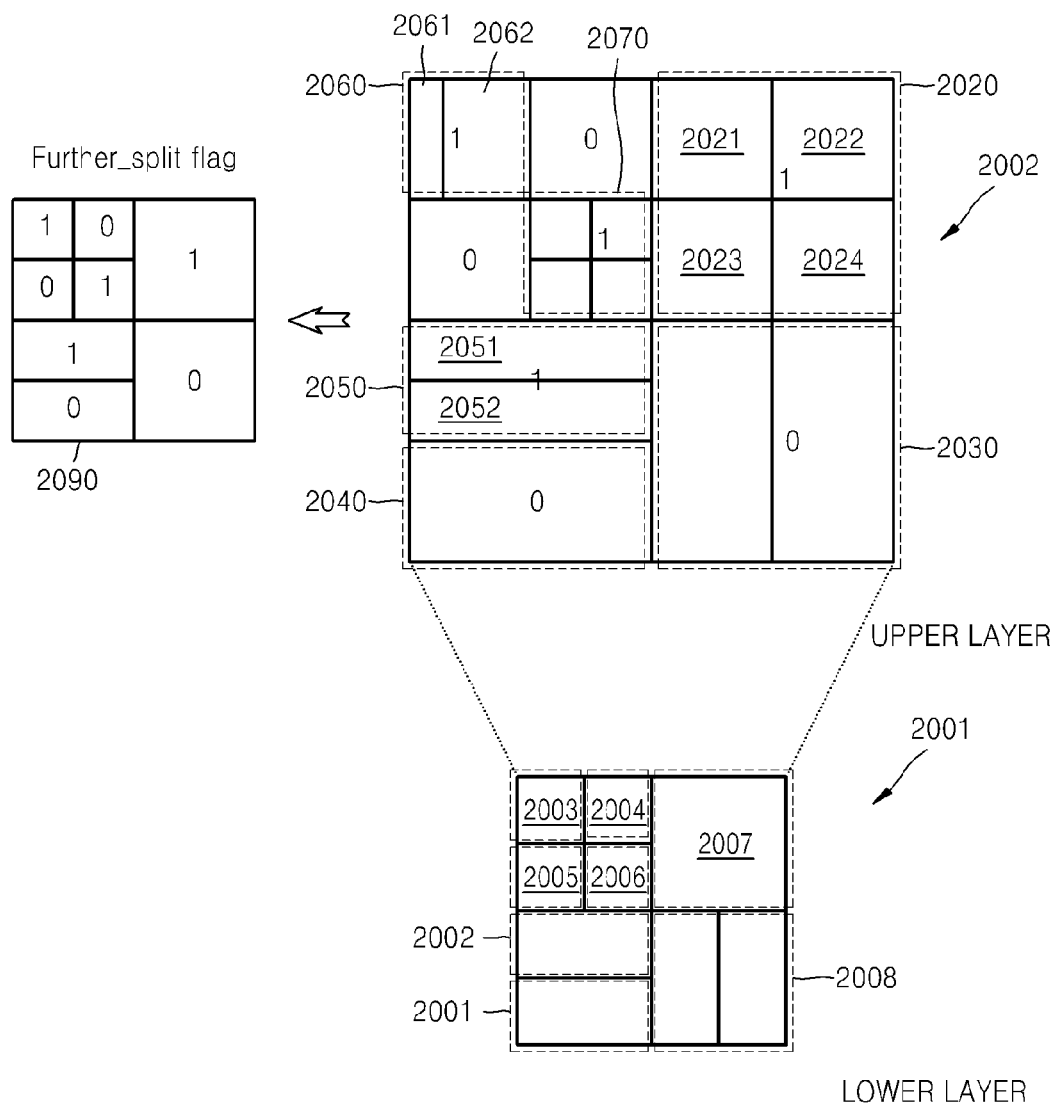
FIG. 20 illustrates an example of determining a second flag (Further_Split flag), which indicates whether a data unit of an upper-layer image is to be additionally split, at a level of a prediction unit according to another exemplary embodiment.

FIG. 20 illustrates an example of determining a second flag (Further_Split flag), which indicates whether a data unit of an upper-layer image is to be additionally split, at a level of a prediction unit according to another exemplary embodiment. In FIG. 20, it is assumed that a dotted line indicates a prediction unit, and a solid line in the prediction coding unit indicates a boundary between smaller prediction units (partitions) that is obtained by splitting the prediction unit. Additionally, as shown in FIG. 20, it is assumed that a final split structure of a prediction unit is determined with respect to a maximum coding unit 2001 of a lower-layer image and a maximum coding unit 2002 of an upper-layer image.

The second flag may be set with respect to each prediction unit of the upper-layer image. Referring to FIG. 20, a prediction unit 2020 of an upper layer which corresponds to a prediction unit 2007 of a lower layer is split into smaller prediction units 2021 through 2024. Accordingly, the scalable video apparatus 1400 sets the second flag (Further_Split flag) of the prediction unit 2020 of the upper-layer image to 1. Additionally, a prediction unit 2050 of an upper layer which corresponds to a prediction unit 2002 of a lower layer is split into two smaller prediction units 2051 and 2052. Accordingly, the scalable video encoder 1400 sets the second flag of the prediction unit 2050 of the upper layer to 1. Similarly, prediction units 2060 and 2070 of an upper layer which correspond to coding units 2003 and 2006 of the lower layer are also split into small prediction units. Accordingly, the scalable video encoder 1400 sets the second flag of the prediction units 2003 and 2006 of the upper layer to 1. If a prediction unit of the lower layer and a prediction unit of the upper layer corresponding to the lower layer have a same split structure, the scalable video encoder 1400 sets the second flag of the prediction unit of the upper layer to 0. As such, second flag information 2090 of each coding unit included in a maximum coding unit of the upper-layer image may be obtained by setting a second flag of the prediction unit to 1 if a prediction unit included in a prediction unit of an upper layer is split into smaller prediction units, and setting the second flag to 0 if an initial split structure is maintained.

Figure 21:
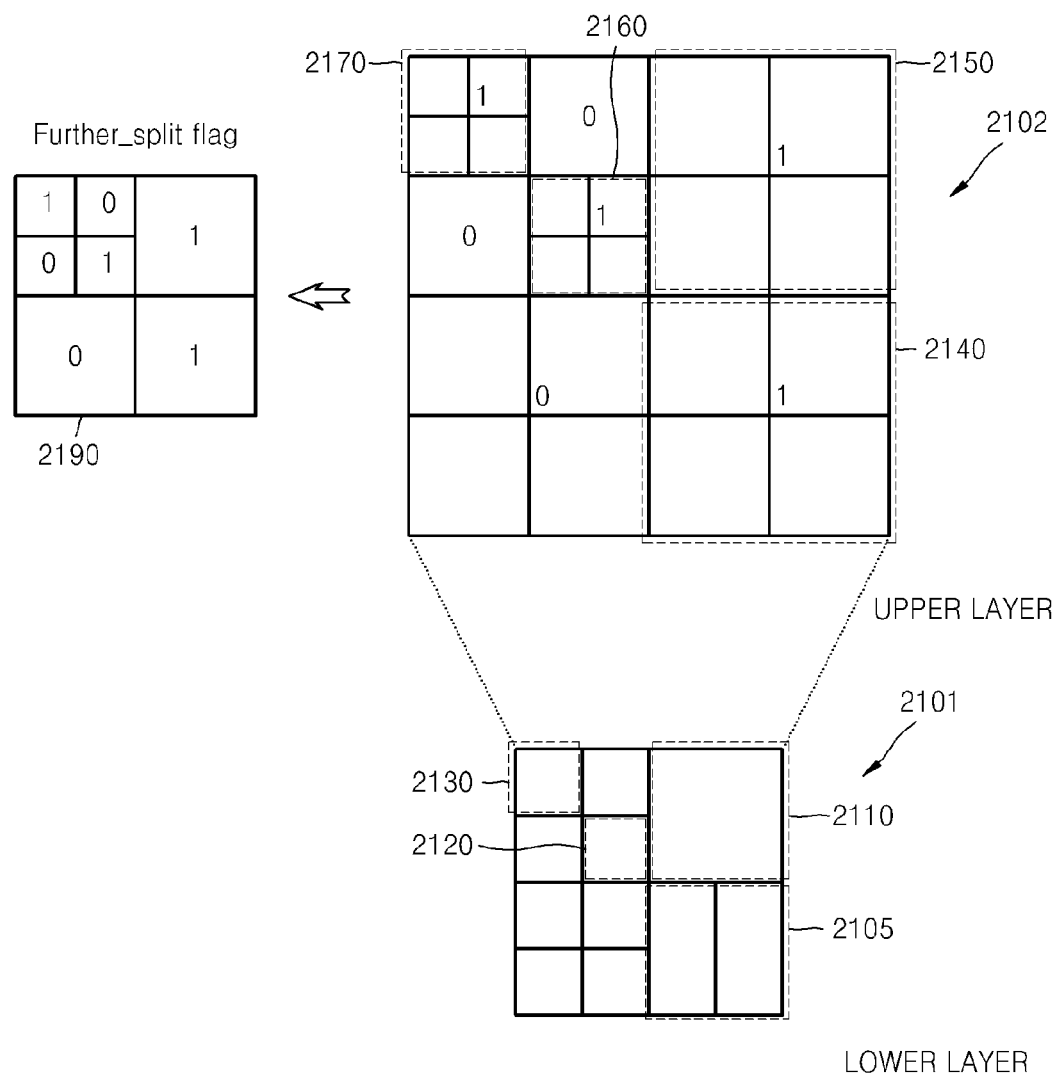
FIG. 21 illustrates an example of determining a second flag (Further_Split flag), which indicates whether a data unit of an upper-layer image is to be additionally split, at a level of a transformation unit according to another exemplary embodiment.

FIG. 21 illustrates an example of determining a second flag, which indicates whether a data unit of an upper-layer image is to be additionally split, at a level of a transformation unit according to another exemplary embodiment. In FIG. 21, it is assumed that a dotted line indicates a transformation unit, and a solid line in the transformation unit indicates a boundary between small prediction units (partitions) that is obtained by splitting the transformation unit. Additionally, as shown in FIG. 21, it is assumed that a final split structure of a transformation unit is determined with respect to a maximum coding unit 2101 of a lower-layer image and a maximum coding unit 2102 of an upper-layer image.

The second flag may be set with respect to each transformation unit of the upper-layer image. Referring to FIG. 21, a transformation unit 2140 of an upper layer which corresponds to a transformation unit 2105 of a lower layer is split into small transformation units. Accordingly, the scalable video apparatus 1400 sets the second flag (Further_Split flag) of the transformation unit 2140 of the upper-layer image to 1. Additionally, a transformation unit 2150 of an upper layer which corresponds to a transformation unit 2110 of a lower layer is split into small prediction units. Accordingly, the scalable video encoder 1400 sets the second flag (Further_Split flag) of the transformation unit

2150 of the upper layer to 1. Additionally, transformation units 2160 and 2170 of an upper layer which correspond to transformation units 2120 and 2230 of the lower layer are split into small transformation units. Accordingly, the scalable video encoder 1400 sets the second flag of the transformation units 2160 and 2170 of the upper layer to 1. As such, second flag information 2190 of each transformation unit included in a maximum coding unit of the upper-layer image may be obtained by setting a second flag of the transformation unit to 1 if a transformation unit of an upper layer is split into smaller prediction units, and setting the second flag to 0 if an initial split structure is maintained.

Figure 22:
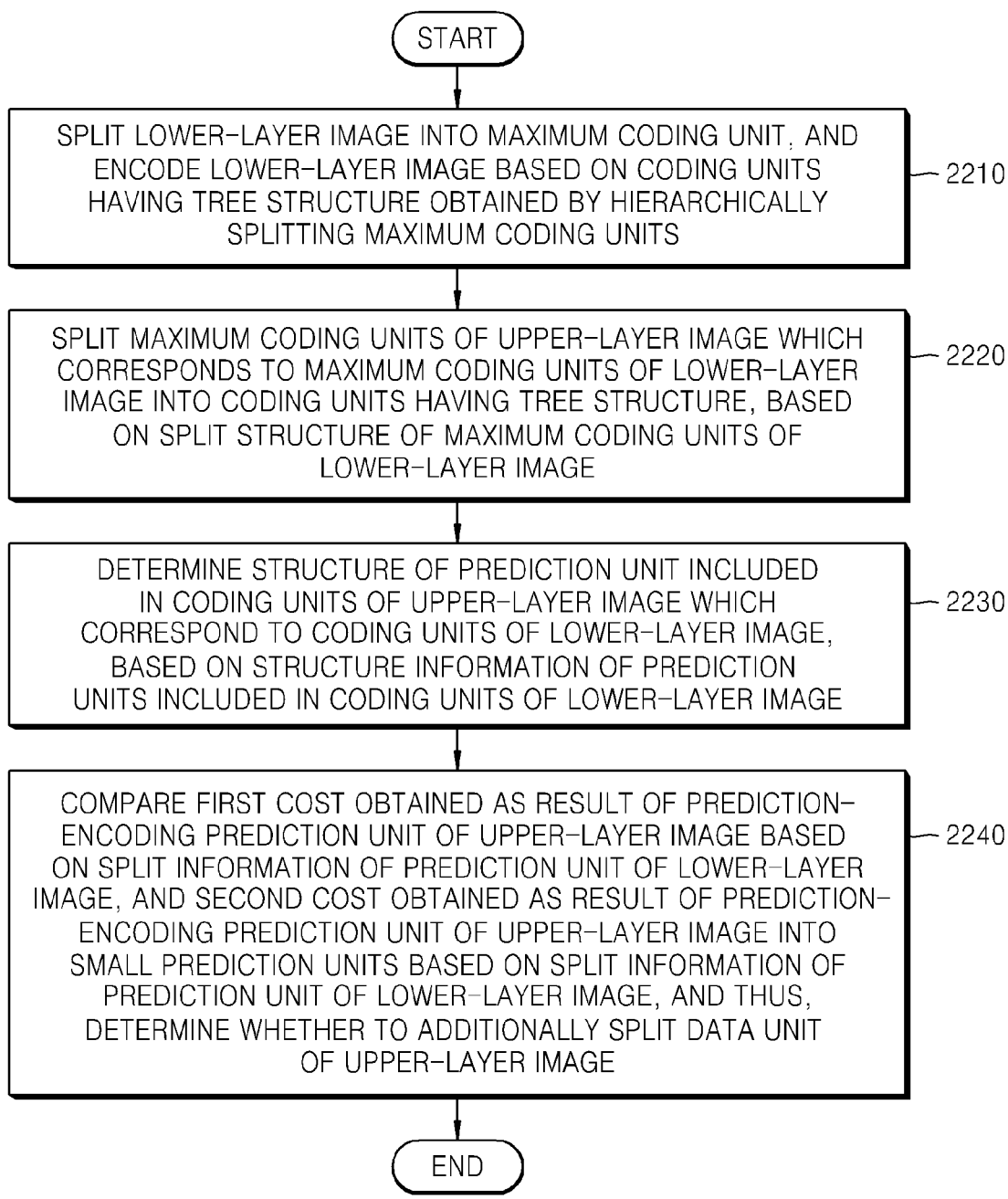
FIG. 22 is a flowchart of a scalable video encoding method according to an exemplary embodiment.

FIG. 22 is a flowchart of a scalable video encoding method according to an exemplary embodiment.

Referring to FIG. 22, in operation 2210, the lower-layer encoder 1410 splits a lower-layer image into maximum coding units, and encodes a lower-layer image based on coding units having a tree structure which are obtained by hierarchically splitting the maximum coding units.

In operation 2220, the upper-layer encoder 1420 splits maximum coding units of an upper-layer image which corresponds to the maximum coding units of the lower-layer image into coding units having a tree structure, based on a split structure of the maximum coding units of the lower-layer image.

In operation 2230, the upper-layer encoder 1420 determines a structure of a prediction unit included in the coding units of the upper-layer image which correspond to the coding units of the lower-layer image, based on structure information of the prediction units included in the coding units of the lower-layer image. If the upper-layer encoder 1420 determines a split structure of a data unit, included in the maximum coding units of the upper-layer image that corresponds to the lower-layer image, based on the split structure of a data unit included in the maximum encoding unit of the lower-layer image, the upper-layer encoder 1420 may set a first flag (BL_Split flag) to 1, and include the first flag in coding information of the maximum coding unit of the upper-layer image, and transmit the coding information.

In operation 2240, the upper-layer encoder 1420 compares a first cost obtained as a result of prediction-encoding a prediction unit of the upper-layer image based on split information of the prediction unit of the lower-layer image, and a second cost obtained as a result of prediction-encoding a prediction unit of the upper-layer image into small prediction units based on split information of the prediction unit of the lower-layer image, and thus, determine whether to additionally split the data unit of the upper-layer image. If the second cost is smaller than the first cost, the upper-layer encoding unit 1420 determines that a prediction unit included in the initial split structure of the upper-layer image is to be split into smaller data units. Additionally, the upper-layer encoding unit 1420 sets the second flag (Further_Split flag) to 1 with respect to the prediction unit of the upper-layer image which is to be split, and outputs information about the set second flag. If a final prediction unit of the upper layer is determined, the upper-layer encoding unit 1420 may encode the upper-layer with reference to motion information of the lower-layer image.

The upper-layer encoder 1420 may implicitly determine whether to split a data unit into small data units at each level of a data unit, without having to expressly encode the first flag (BL_Split flag) and the second flag (Further_Split Flag). Particularly, the upper-layer encoder 1420 may determine whether to split a current data unit of the upper-layer image into small data units, by analyzing image characteristics of a data unit of a lower-layer image which corresponds to a current data unit of the upper-layer image. For example, if an area of a prediction unit of a lower-layer image is homogenous and another area of the prediction unit contains a high-frequency element, and if a prediction unit of the lower-layer image may be split with reference to a boundary between the homogenous area and the area containing a high-frequency element, the upper-layer encoder 1420 may split a data unit of the upper-layer image into small data units with reference to a boundary of a data unit of the lower-layer image. Homogeneity of the data unit of the lower-layer image may be determined by using a gradient, a variance, a sum of residual signals, and an absolute sum of residual signals. Additionally, if an edge is included in a data unit of a lower-layer image, the upper-layer encoder 1420 may split a data unit of an upper-layer image corresponding to the lower-layer image into small data units, by using the edge included in the data unit of the lower-layer image.

FIG. 24 is a detailed block diagram of a scalable decoding apparatus 2400 according to an exemplary embodiment.

The scalable encoding apparatus 2400 includes a lower-layer decoding apparatus 2410 and an upper-layer decoding apparatus 2460. The lower-layer decoding apparatus 2410 and the upper-layer decoding apparatus 2460 may correspond respectively to the lower-layer encoding apparatus 1520 and the upper-layer encoding apparatus 1530, shown in FIG. 16.

When the parser 1510 parses and outputs encoding information of a lower-layer image and encoding information of an upper-layer image from a bitstream, an inverse-quantizer/inverse-transformer 2420 outputs restored residual information by performing inverse-quantization and inverse-transformation on a residual of the lower-layer image. A motion compensation unit 2440 outputs a prediction value by performing inter-prediction on a current prediction unit, and an intra-prediction unit 2445 outputs a prediction value by performing intra-prediction on a current prediction unit. A decoding controller 2415 determines a prediction mode from among the intra-prediction mode and the inter-prediction mode, based on prediction mode information of a current prediction unit of the lower-layer image which is included in encoding information of the lower-layer image, and controls a prediction switch 2448 so that a prediction value according to the determined prediction mode is output. A current prediction unit of the lower layer is restored by adding the restored residual to a prediction value of the current prediction unit which is obtained through intra-prediction or inter-prediction. A restored lower-layer image is stored in a storage 2430. A deblocking unit 2435 (e.g., deblocker) performs deblocking filtering on the restored lower-layer image.

An inter-layer prediction apparatus 2450 outputs lower-layer image information to the upper-layer decoding apparatus 2460 so that the lower-layer image is used for prediction-encoding the upper-layer image. A deblocking unit 2455 (e.g., deblocker) included in the inter-layer prediction apparatus 2450 performs deblocking filtering on the restored lower-layer image, and outputs the lower-layer image on which the deblocking filtering is performed to the upper-layer decoding apparatus 2460.

The upper-layer decoding apparatus 2460 encodes the upper-layer image based on encoding information of the lower-layer image that is decoded by the lower-layer encoding apparatus 2610. The upper-layer decoding apparatus 2460 may apply the encoding information of the lower-layer image which is determined by the lower-layer decoding apparatus 2410 to encoding of the upper-layer image, or determine encoding information that is to be applied to encoding of the upper-layer image by changing the encoding information of the lower-layer image.

An inverse-quantizer/inverse-transformer 2470 outputs restored residual information by performing inverse-quantization and inverse-transformation on a residual of the upper-layer image. A motion compensation unit 2490 (e.g., motion compensator) outputs a prediction value by performing inter-prediction on a current prediction unit of the upper layer, and an intra-prediction unit 2495 (e.g., intra-predictor) outputs a prediction value by performing intra-prediction on a current prediction unit. The motion compensation unit 2490 may determine a motion vector of the prediction unit of the upper layer by scaling a motion vector of the prediction unit of the lower layer which corresponds to the prediction unit of the upper layer.

A decoding controller 2465 determines a prediction mode from among the intra-prediction mode and the inter-prediction mode, based on prediction mode information included in encoding information of the lower-layer image, and controls a prediction switch 2498 so that a prediction block according to the determined prediction mode is output. A current prediction unit of the lower layer is restored by adding the restored residual to a prediction value of the current prediction unit which is obtained through intra-prediction or inter-prediction. A restored lower-layer image is stored in a storage 2480. A deblocking filtering unit 2485 (e.g., deblocking filter) performs deblocking filtering on the restored lower-layer image.

Figure 23:
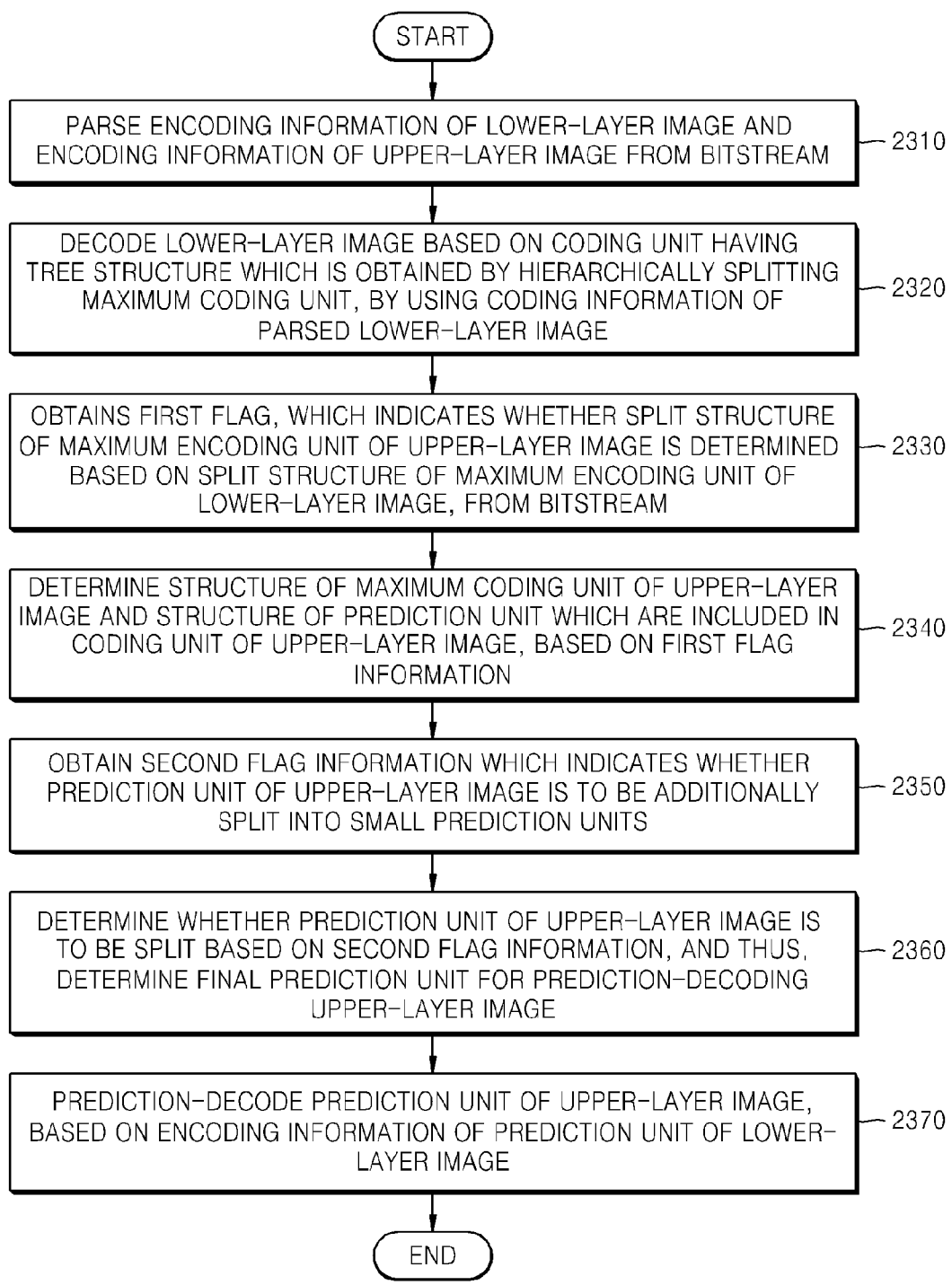
FIG. 23 is a flowchart of a scalable video decoding method according to an exemplary embodiment.

FIG. 23 is a flowchart of a scalable video decoding method according to an exemplary embodiment.

Referring to FIG. 23, in operation 2310, the parser 1510 parses encoding information of a lower-layer image and encoding information of an upper-layer image from a bitstream.

In operation 2320, the lower-layer decoder 1520 decodes a lower-layer image based on a coding unit having a tree structure which is obtained by hierarchically splitting a maximum coding unit, by using coding information of the parsed lower-layer image.

In operation 2330, the upper-layer decoder 1530 obtains a first flag (BL_Split flag) from a bitstream, wherein the first flag indicates whether a split structure of a maximum encoding unit of the upper-layer image is determined based on a split structure of a maximum encoding unit of the lower-layer image.

In operation 2340, the upper-layer decoder 1530 may determine a structure of a maximum coding unit of the upper-layer image and a structure of a prediction unit which are included in the coding unit of the upper-layer image, based on first flag information (BL_Split flag).

As described above, if the first flag (BL_Split flag) is 1, an initial structure of an upper layer is determined based on structure information of the lower-layer image. Accordingly, if the first flag (BL_Split flag) is 1, a coding unit, a prediction unit, and a transformation unit which are obtained by splitting a maximum coding unit of the upper-layer image is determined to be like a structure of a coding unit, a prediction unit, and a transformation unit which are obtained by splitting a maximum coding unit of the lower-layer image.

In operation 2350, the upper-layer decoder 1530 obtains second flag information (Further_Split flag) which indicates whether a prediction unit of the upper-layer image is to be additionally split into small prediction units. As described above, if the first flag (BL_Split flag) is 1, the coding unit, the prediction unit, and the transformation unit included in the maximum coding unit in the upper-layer image may be respectively split into smaller data units. Whether each of that the coding unit, the prediction unit, and the transformation unit is split into a smaller data unit may be indicated via the second flag (Further_Split flag) which is set with respect to each data unit.

In operation 2360, the upper-layer decoder 1530 determines whether a prediction unit of the upper-layer image is to be split based on the second flag information, and thus, determines a final prediction unit for prediction-decoding the upper-layer image. If the second flag (Further_Split flag) is 1, a data unit of the upper-layer image may be split into smaller data units. If the second flag (Further_Split flag) is 0, a data unit of the upper layer is not split, and a structure of a data unit determined based on split structure information of the lower-layer image is maintained.

In operation 2370, the upper-layer decoder 1530 prediction-decodes a prediction unit of an upper-layer image, based on encoding information of a prediction unit of a lower-layer image. For example, the upper-layer decoder 1530 may obtain prediction mode information and motion information, which is to be applied to a prediction unit of the upper layer, based on the prediction mode information and the motion information of the prediction unit of the lower layer which corresponds to a prediction unit of the upper layer that is currently being decoded, and decode a prediction unit of the upper layer, based on the obtained prediction mode information and motion information. The upper-layer decoder 1530 may modify encoding information derived from the lower-layer image, and determine encoding information of the upper-layer image by using the modified encoding information. The upper-layer decoder 1530 may use the encoding information of the upper-layer image which is determined based on the encoding information of the lower-layer image. Alternately, the upper-layer decoder 1530 may change the encoding information of the upper-layer image, which is determined based on the encoding information of the lower-layer image, based on change information obtained from a bitstream and use the changed encoding information to decode the upper-layer image. For example, the upper-layer decoding unit 1530 may obtain an initial motion vector of a current prediction unit of the upper layer based on a motion vector of a prediction unit of the lower layer, modify the initial motion vector based on modified motion vector information included in the bitstream, and thus, obtain a final motion vector that is to be applied to the current prediction unit of the upper layer.

Exemplary embodiments can be embodied as computer-readable codes on a computer-readable recording medium (including all devices with a data processing capability). The computer-readable recording medium is any data storage device that can store data which can be thereafter read by a computer system. Examples of the computer-readable recording medium include read-only memory (ROM), random-access memory (RAM), CD-ROMs, magnetic tapes, floppy disks, optical data storage devices, etc. The computer-readable recording medium can also be distributed over network coupled computer systems so that the computer-readable code is stored and executed in a distributed fashion.

While the exemplary embodiments have been particularly shown and described with reference to certain exemplary embodiments thereof, it will be understood by those skilled in the art that various changes in form and details may be made therein without departing from the spirit and scope of the exemplary embodiments as defined by the appended claims. The exemplary embodiments should be considered in a descriptive sense only and not for purposes of limitation. Therefore, the scope of the exemplary embodiments is defined not by the detailed description of the exemplary embodiments but by the appended claims, and all differences within the scope thereof will be construed as being included in the exemplary embodiments.

What is claimed is:

1. A scalable video encoding method comprising:

splitting a lower-layer image into a maximum coding unit, and encoding the lower-layer image based on coding units having a tree structure which is obtained by hierarchically splitting the maximum coding unit;

splitting a maximum coding unit of an upper-layer image which corresponds to the maximum coding unit of the lower-layer image into coding units having the tree structure, based on a split structure of the maximum coding unit of the lower-layer image;

determining a structure of a prediction unit included in the coding units of the upper-layer image which correspond to the coding units of the lower-layer image, based on structure information indicating a structure of the prediction unit included in the coding units of the lower-layer image;

determining whether to split the prediction unit included in the coding units of the upper-layer image by comparing a first cost obtained as a result of prediction-encoding the prediction unit included in the coding units of the upper-layer image based on encoding information of the prediction unit included in the coding units of the lower-layer image, to a second cost obtained as a result of prediction-encoding the prediction unit included in the coding units of the upper-layer image into small prediction units which are smaller than the prediction unit included in the coding units of the upper-layer image based on encoding information of the prediction unit included in the coding units of the lower-layer image; and encoding a first flag indicating whether a split structure of the maximum coding unit of the upper-layer image is determined based on the split structure of the maximum coding unit of the lower-layer image, and a second flag indicating whether the prediction unit included in the coding units of the upper-layer image is to be split into the small prediction units.

2. The scalable video encoding method of claim 1, wherein the determining of the structure of the prediction unit included in the coding units of the lower-layer image comprises determining an initial structure of the prediction unit included in the coding units of the upper-layer image as corresponding to the structure of the prediction unit included in the coding units of the lower-layer image, and the determining of whether to split the prediction unit included in the coding units of the upper-layer image comprises splitting the prediction unit included in the coding units of the upper-layer image into the small prediction units, in response to determining that the second cost is smaller than the first cost.

3. The scalable video encoding method of claim 1, wherein the prediction unit included in the coding units of the upper-layer image is split into the small predictions units by using a method, from among a first splitting method of splitting the prediction unit included in the coding units of the upper-layer image into the small prediction units according to a predetermined rule, a second splitting method of adaptively splitting the prediction unit of the lower-layer image into the small prediction units based on a size of the prediction unit included in the coding units of the upper-layer image, and a third splitting method of splitting the prediction unit included in the coding units of the upper-layer image into the small prediction units based on image characteristics of the prediction unit included in the coding units of the lower-layer image which corresponds to the prediction unit included in the coding units of the upper-layer image.

4. The scalable video encoding method of claim 1, wherein the prediction unit included in the coding units of the upper-layer image is motion-predicted by using a scaled motion vector that is obtained by scaling a motion vector of the prediction unit included in the coding units of the lower-layer image based on a resolution ratio between a resolution of the upper-layer image and a resolution of the lower-layer image.

5. The scalable video encoding method of claim 4, wherein the small prediction units have a scaled motion vector or a changed motion vector which is obtained by changing the scaled motion vector within a predetermined range, if the prediction unit included in the coding units of the upper-layer image is split into the small prediction units.

6. The scalable video encoding method of claim 1, further comprising determining a structure of a transformation unit included in the coding units of the upper-layer image that correspond to the coding units of the lower-layer image, based on structure information of a transformation unit included in the coding units of the lower-layer image.

7. A scalable video encoder comprising:

at least one processor; and a memory storing a program which causes the at least one processor to;

split a lower-layer image into a maximum coding unit, and encode the lower-layer image based on coding units having a tree structure which is obtained by hierarchically splitting the maximum coding unit;

split a maximum coding unit of an upper-layer image which corresponds to the maximum coding unit of the lower-layer image into coding units having the tree structure, based on a split structure of the maximum coding unit of the lower-layer image, determine a structure of a prediction unit included in the coding units of the upper-layer image which correspond to the coding units of the lower-layer image, based on structure information of a structure of a prediction unit included in the coding units of the lower-layer image, and determine whether to split the prediction unit included in the coding units of the upper-layer image by comparing a first cost obtained as a result of prediction-encoding the prediction unit included in the coding units of the upper-layer image based on encoding information of the prediction unit included in the coding units of the lower-layer image, to a second cost obtained as a result of prediction-encoding the prediction unit included in the coding units of the upper-layer image into small prediction units which are smaller than the prediction unit included in the coding units of the upper-layer image based on encoding information of the prediction unit included in the coding units of the lower-layer image; and encode a first flag indicating whether a split structure of the maximum coding unit of the upper-layer image is determined based on the split structure of the maximum coding unit of the lower-layer image, and a second flag indicating whether the prediction unit included in the coding units of the upper-layer image is to be split into the small prediction units.

8. A scalable video decoding method comprising:
parsing encoding information of a lower-layer image and encoding information of an upper-layer image from a bitstream;
decoding the lower-layer image based on a coding unit having a tree structure which is obtained by hierarchically splitting a maximum coding unit of the lower-layer image, by using the parsed encoding information of the lower-layer image;
obtaining first flag information, which indicates whether a split structure of a maximum coding unit of the upper-layer image is determined based on a split structure of the maximum coding unit of the lower-layer image, from the bitstream;
determining the split structure of the maximum coding unit of the upper-layer image and a structure of a prediction unit included in a coding unit of the upper-layer image, based on the first flag information;
obtaining second flag information indicating whether the prediction unit included in the coding unit of the upper-layer image is to be split into small prediction units which are smaller than the prediction unit included in the coding unit of the upper-layer image;
determining a final prediction unit for prediction-decoding the upper-layer image by determining whether to split the prediction unit included in the coding unit of the upper-layer image based on the second flag information; and
prediction-decoding the prediction unit of the upper-layer image, based on encoding information of a prediction unit included in a coding unit of the lower-layer image.

9. The scalable video decoding method of claim 8, wherein the determining of the structure of the prediction unit included in the coding unit of the upper-layer image comprises splitting the maximum coding unit of the upper-layer image into coding units having the tree structure based on a split structure of the maximum coding unit of the lower-layer image, and determining an initial structure of the prediction unit included in the coding unit of the upper-layer image which corresponds to the coding unit of the lower-layer image based on structure information of the prediction unit included in the coding unit of the lower-layer image, if it is determined that the split structure of the maximum coding unit of the upper-layer image is based on the split structure of the maximum coding unit of the lower-layer image, based on the first flag information, and
the determining of the final prediction unit for prediction-decoding the upper-layer image comprises determining the final prediction unit by splitting the prediction unit included in the coding unit of the upper-layer image having the initial structure, based on the second flag information.

10. The scalable video decoding method of claim 8, wherein the prediction unit included in the coding unit of the upper-layer image is split into the small prediction units by using a method, from among a first splitting method of splitting the prediction unit included in the coding unit of the upper-layer image into the small prediction units according to a predetermined rule, a second splitting method of adaptively splitting the prediction unit included in the coding unit of the upper-layer image into the small prediction units based on a size of the prediction unit included in the coding unit of the upper-layer image, and a third splitting method of splitting the prediction unit included in the coding unit of the upper-layer image into the small prediction units, based on image characteristics of the prediction unit included in the coding unit of the lower-layer image which corresponds to the prediction unit of the upper-layer image.

11. The scalable video decoding method of claim 8, wherein the prediction unit included in the coding unit of the upper-layer image is motion-predicted by using a scaled motion vector that is obtained by scaling a motion vector of the prediction unit included in the coding unit of the lower-layer image based on a resolution ratio between a resolution of the upper-layer image and a resolution of the lower-layer image.

12. The scalable video decoding method of claim 11, wherein the small prediction units have a scaled motion vector or a changed motion vector which is obtained by changing the scaled motion vector within a predetermined range, if the prediction unit included in the coding unit of the upper-layer image is split into the small prediction units.

13. The scalable video decoding method of claim 8, further comprising determining a structure of a transformation unit included in the coding unit of the upper-layer image that corresponds to the coding unit of the lower-layer image, based on structure information of a transformation unit included in the coding unit of the lower-layer image.

14. A scalable video decoder comprising:
at least one processor; and
a memory storing a program which causes the at least one processor to:
parse encoding information of a lower-layer image and encoding information of an upper-layer image from a bitstream;
decode the lower-layer image based on a coding unit having a tree structure which is obtained by hierarchically splitting a maximum coding unit of the lower-layer image, by using the parsed encoding information of the lower-layer image; and
determine a split structure of a maximum coding unit of the upper-layer image and a structure of a prediction unit included in a coding unit of the upper-layer image, based on first flag information obtained from the bitstream, wherein the first flag information indicates whether the split structure of the maximum coding unit of the upper-layer image is determined based on a split structure of the maximum coding unit of the lower-layer image, and determine a final prediction unit for prediction-decoding the upper-layer image by determining whether to split the prediction unit included in the coding unit of the upper-layer image based on second flag information obtained from the bitstream and prediction-decode the prediction unit included in the coding unit of the upper-layer image, based on encoding information of a prediction unit included in a coding unit of the lower-layer image based on the second flag information, wherein the second flag information indicates whether the prediction unit included in the coding unit of the upper-layer image is to be split into small prediction units which are smaller than the prediction unit included in the coding unit of the upper-layer image.

* * * * *